(12) United States Patent
Miyabayashi et al.

(10) Patent No.: US 8,010,145 B2
(45) Date of Patent: Aug. 30, 2011

(54) MOBILE COMMUNICATION TERMINAL, MOBILE COMMUNICATION SYSTEM, AND STORAGE MEDIUM

(75) Inventors: Shinji Miyabayashi, Fussa (JP); Osamu Yamashita, Tachikawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1030 days.

(21) Appl. No.: 11/324,904

(22) Filed: Jan. 4, 2006

(65) Prior Publication Data

US 2006/0154670 A1 Jul. 13, 2006

(30) Foreign Application Priority Data

Jan. 12, 2005 (JP) ................................ 2005-005055

(51) Int. Cl.
*H04B 7/00* (2006.01)
(52) U.S. Cl. .................. 455/522; 455/436; 370/331
(58) Field of Classification Search .................. 455/450, 455/411, 432.1, 435.1, 436, 444, 69, 67.11, 455/522; 379/221.01, 352, 88.17; 370/338, 370/331, 318, 311
See application file for complete search history.

(56) References Cited

U.S. PATENT DOCUMENTS

| | | | |
|---|---|---|---|
| 2004/0192211 A1 | 9/2004 | Gallagher | |
| 2005/0130662 A1* | 6/2005 | Murai | 455/444 |
| 2006/0099929 A1* | 5/2006 | Frank et al. | 455/411 |
| 2006/0142021 A1* | 6/2006 | Mueckenheim et al. | 455/453 |
| 2007/0232312 A1* | 10/2007 | Gallagher et al. | 455/436 |
| 2010/0020762 A1* | 1/2010 | Creamer et al. | 370/331 |

FOREIGN PATENT DOCUMENTS

| | | |
|---|---|---|
| CN | 1234711 | 11/1999 |
| CN | 1543259 | 11/2004 |
| JP | 09-247741 | 9/1997 |
| JP | 10-257155 | 9/1998 |
| JP | 2003-224511 | 8/2003 |
| JP | 2004-159073 | 6/2004 |
| KR | 2003-0016617 | 3/2003 |
| KR | 2004-0092911 | 11/2004 |
| WO | WO 95/01013 | 5/1995 |

OTHER PUBLICATIONS

Office Action dated Apr. 11, 2008 (with English translation) issued for the corresponding Chinese Patent Application No. 200610005109 (6 pgs.).

* cited by examiner

*Primary Examiner* — Kamran Afshar
*Assistant Examiner* — Khawar Iqbal
(74) *Attorney, Agent, or Firm* — Cozen O'Connor

(57) ABSTRACT

When moving from a public wireless area to a local wireless area, a mobile communication terminal transmits its telephone number to a local wireless service authentication server to inquire whether the mobile communication terminal can receive a local wireless service. The local wireless service authentication server, in response to the inquiry, determines whether the telephone number of the mobile communication terminal itself is registered in a local telephone number storage unit. When the number is registered therein, a transmission power level reduction instruction signal is transmitted to the mobile communication terminal. The mobile communication terminal, in response to the reception of the signal, controls the wireless unit to reduce output level of the transmission power in a wireless unit to a level that it can be received by a local base station while it cannot be received by a public base station. This enables restricting communication that uses public wireless network.

17 Claims, 15 Drawing Sheets

LOCAL BASE STATION LIST 33

| BASE STATION IDENTIFICATION NUMBER A |
| BASE STATION IDENTIFICATION NUMBER B |
| BASE STATION IDENTIFICATION NUMBER C |
| . . . |

LOCAL TELEPHONE NUMBER LIST 34

| TELEPHONE NUMBER A1 |
| TELEPHONE NUMBER A2 |
| TELEPHONE NUMBER A3 |
| . . . |

MOBILE COMMUNICATION TERMINAL, MOBILE COMMUNICATION SYSTEM, AND STORAGE MEDIUM

BACKGROUND OF THE INVENTION

1. Field of the Invention

This invention relates to a mobile communication terminal and mobile communication system that are capable of restricting a specific function in a specific communication area.

2. Description of the Related Art

Use of mobile communication terminal in a hospital or a vehicle, including an airplane, might lead to malfunctioning of medical equipment or a pacemaker. It is considered good etiquette, for this reason, to switch-off a mobile communication terminal in such areas. That having been said, some people ignore such etiquette.

Against this backdrop, there is disclosed an information notification system that disables a mobile communication terminal brought in a specific area and re-enables the terminal outside the area, in Unexamined Japanese Patent Application KOKAI Publication No. 2004-159073.

This information notification system enables and disables all the functions of a mobile communication terminal. This causes disablement of functions that do not need disabling.

The present invention is made in view of this, and it is an object of the present invention to provide a mobile communication terminal, a system, a method, and a program that are capable of disabling only a specific function in a specific area.

SUMMARY OF THE INVENTION

To achieve the above object, a mobile communication terminal according to a first aspect of the present invention determines whether a second communication network is available, in accordance with movement of the mobile communication terminal from a communication area of a first base station constituting a first communication network to a communication area of a second base station constituting the second communication network which is different from the first communication network, and the mobile communication terminal enables communication that uses the second communication network and restricts communication that uses the first communication network when the communication availability determination means determines that the second communication network is available.

Further, to achieve the above object, mobile communication system according to the second aspect of the present invention is a mobile communication system comprising: a first communication network, a second communication network which is different from the first communication terminal, a mobile communication terminal which can perform communication using at least the first communication network, and an authentication unit which determines whether the mobile communication terminal can use the second communication network, wherein the mobile communication terminal, in accordance with the mobile communication terminal's moving from a communication area of a first base station that constitutes a first communication network to a communication area of a second base station that constitutes the second network, inquires, to the authentication unit by sending identification information specific to the mobile communication terminal, whether the second communication network is available. And then, against the inquiry, when being notified by the authentication unit that the second communication network is available, the mobile communication system enables communication that uses the second communication network and restricts communication that uses the first communication network.

Further, to achieve the above object, the mobile communication system according to the third aspect of the present invention is a mobile communication system having an authentication unit which determines whether a mobile communication terminal connected to a first communication network and a second communication network and capable of performing communication using the first communication network can use the second communication network, wherein the authentication unit stores terminal identification information identifying a mobile communication terminal that can use the second communication network, and when receiving the terminal identification information transmitted by the mobile communication terminal, determines whether the terminal identification information received by the terminal identification information reception means is stored in the terminal identification means storage means. Then, when determining that the received terminal identification information is stored in the terminal identification information storage means, the mobile communication terminal notifies, to the mobile communication terminal, an inquiry result which notifies that the mobile communication terminal can use the second communication network.

Further, to achieve the above object, a method for restricting communication according to the fourth aspect of the present invention determines, in accordance with movement of the mobile communication terminal from a communication area of a first base station constituting a first communication network to a communication area of a second base station constituting a second network which is different from the first communication network, whether the second communication network is available. Then, the method enables communication that uses the second communication network and restricts communication that uses the first communication network when the communication availability determination means determines that the second communication network is available.

Further, to achieve the above object, a computer-readable storage medium having a program recorded thereon, according to the fifth aspect of the present invention, makes a computer included in a mobile communication terminal to execute a communication availability determination process which determines whether a second communication network is available, in accordance with the mobile communication terminal's moving from a communication area of a first base station that constitutes a first communication network to a communication area of a second base station that constitutes the second network which is different from the first communication network; and restriction means which enables communication that uses the second communication network and restricts communication that uses the first communication network when the communication availability determination means determines that the second communication network is available.

BRIEF DESCRIPTION OF THE DRAWINGS

This object and other objects and advantages of the present invention will become more apparent upon reading of the following detailed description and the accompanying drawings in which.

DETAILED DESCRIPTION OF THE PREFERRED EMBODIMENTS

A preferred embodiment to practice the present invention will be described in detail in the following.

First Embodiment

Figure 1:
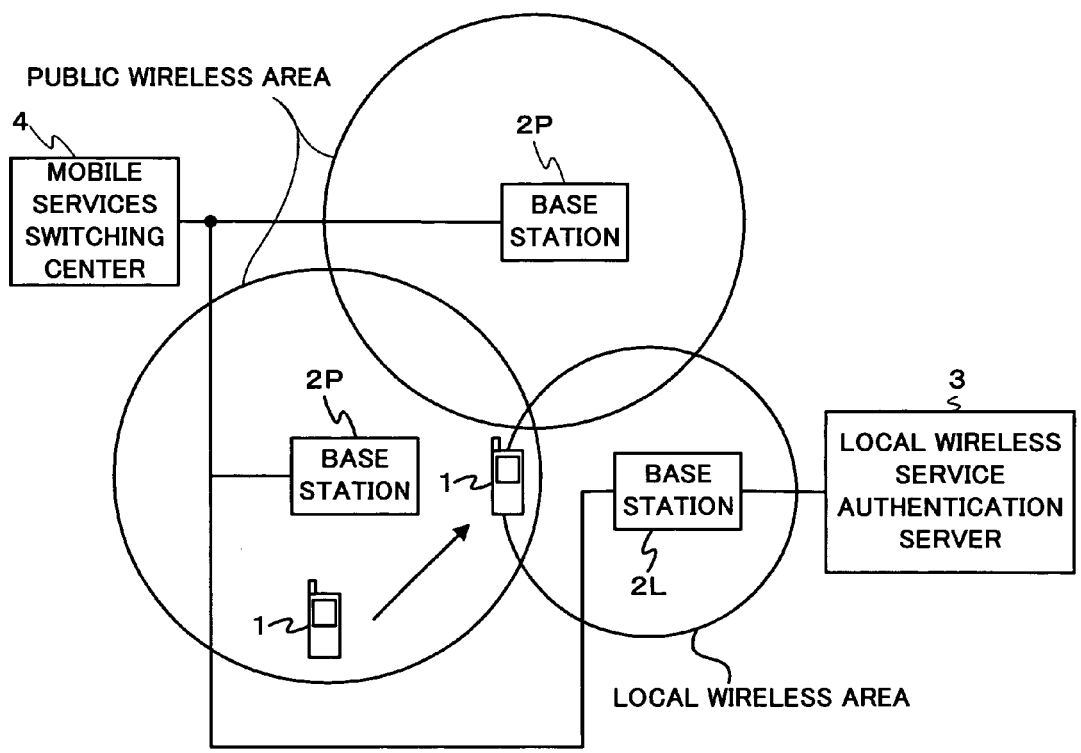
FIG. 1 is a block diagram illustrating an example of the configuration of a local wireless service providing system according to a first embodiment of the present invention.

FIG. 1 is a block diagram illustrating a configuration of a mobile communication system 100 according to a first embodiment of the present invention.

The mobile communication system 100, as shown in FIG. 1, comprises a mobile communication terminal 1, a plurality of public base stations 2P, a local base station 2L, a local wireless service authentication server 3, and a mobile services switching center 4. The public base stations 2P are connected to a mobile services switching center 4, and the local base station 2L is connected to the mobile services switching center 4 and the local wireless service authentication server 3, individually. The mobile communication terminal 1 is a terminal device (telephone) for mobile communication, such as a cellular phone and a PHS (Personal Handyphone System). The mobile communication terminal 1 has: i) a function to provide wireless calling to and from another mobile communication terminal 1 via the public base station 2P and the mobile services switching center 4 (wireless calling function); ii) a function to send and receive an e-mail via the public base station 2P and the Internet (e-mail sending and receiving function); and iii) a function to enable browsing a web page via the public base station 2P and the Internet (browsing function); and so forth. Further, the mobile communication terminal 1 has a function to receive a wireless service provided via the local base station 2L (local wireless service).

Figure 2:
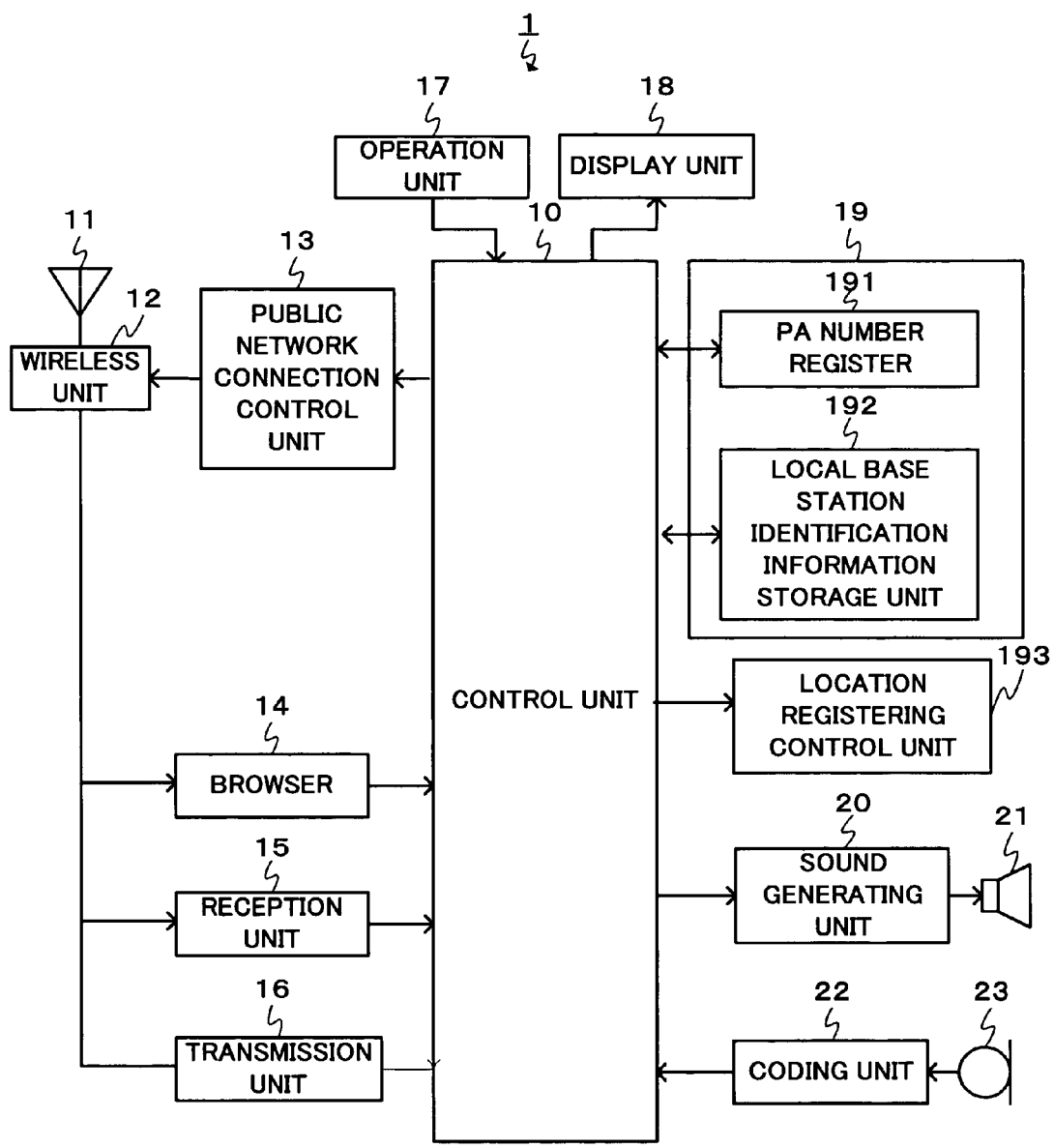
FIG. 2 is a block diagram illustrating an example of the configuration of a mobile communication terminal shown in FIG. 1.

FIG. 2 is a block diagram illustrating an example of a configuration of a mobile communication terminal 1. As shown in FIG. 2, the mobile communication terminal 1 comprises a control unit (circuit) 10, an antenna 11, a wireless unit 12, a public network control unit 13, a browser 14, a reception unit 15, a transmission unit 16, an operation unit 17, a display unit 18, a storage unit 19, a sound generating unit 20, a speaker 21, an encoder 22, and a microphone 23.

The control unit 10 comprises a CPU (Central Processing Unit), a ROM (Read Only Memory), and a RAM (Random Access Memory), and the like. The CPU appropriately executes various programs stored in the ROM, etc. thereby to control operation of each unit and section of the mobile communication terminal 1. The RAM serves as a work memory when the CPU executes a program.

The antenna 11 converts an externally-input electro magnetic wave into an analog signal and converts a transmission signal into an electromagnetic wave to radiate.

The wireless unit 12 downconverts an analog signal provided from the antenna 11, and thereafter generates a digital signal having a chip rate by performing, for example, quadrature-demodulation and A/D (Analog-Digital) conversion on the analog signal, and provides the digital signal to the browser 14 and the reception unit 15. Further, the wireless unit 12, performs D/A (Digital-Analog) conversion and demodulation on the transmission signal provided from the transmission unit 16, and thereafter upconverts the signal and transmit it to the public base stations 2P and the local base 2L via the antenna 11.

The public network connection control unit 13, in accordance with an instruction from the control unit 10, controls a transmission power level in the wireless unit 12, thereby enabling or disabling connection to the public network.

The browser 14 is software to be executed by the CPU of the control unit 10, and the browser 14 enables an access to a web page P designated by a user.

The reception unit 15 obtains a received signal having a symbol rate by performing, for example, back diffusion process and phase correction process on the digital signal having a chip rate and being provided from the wireless unit 12, and provides the received signal to the sound generating unit 20.

The transmission unit 16 performs error correction coding, mapping to a physical channel, and diffusion process on the transmission signal provided for the coding unit 22, and thereafter provides the signal to the wireless unit 12.

The operation unit 17 comprises, for example, a cross cursor key, an arphameric character key for inputting a numeral or a character, a button for designating a function or the like, and is operated by a user.

The display unit 18 comprises, for example, a liquid crystal display (LCD) device or the like, and displays an image, etc. for executing various operations of the mobile communication terminal 1.

The storage unit 19 comprises, for example, an SD (Secure Digital) memory card, etc., in which a memory area such as PA (Paging Area) number register 191 and local base station identification information storage unit 192 are provided.

The PA number register 191 is for storing the PA (Paging Area) number for identifying a cover area of the each base station that is received from the public base stations 2P and the local base station 2L.

The local base station identification information storage unit 192 stores the PA number (local base station identification number) of the local base station 2L in advance.

A location registering control unit 193 registers a location of the mobile communication terminal 1, namely a PA number, to the network.

The sound generation unit 20 decodes the received signal provided from the reception unit 15, and thereafter converts the signal to an analog signal and output it from the speaker 21. Accordingly, a sound from the party at the other end of the phone line, etc. is reproduced from the speaker 21.

The coding unit 22 converts analog sound input from the microphone 23 to the digital signal, and thereafter codes the digital signal to generate a transmission signal, and provides the transmission signal to the transmission unit 16.

The public base stations 2P shown in FIG. 1 individually form public wireless areas with a radius of 2 to 3 kilometers. A public communication network is formed by installing the public base stations 2P in such a way that adjacent public wireless areas overlap with each other. The local base station 2L is used as a base in a comparatively small area, such as inside a 4 to 5-story building, to form a local wireless area (local wireless network) that overlaps an adjacent public wireless area.

Figure 3:
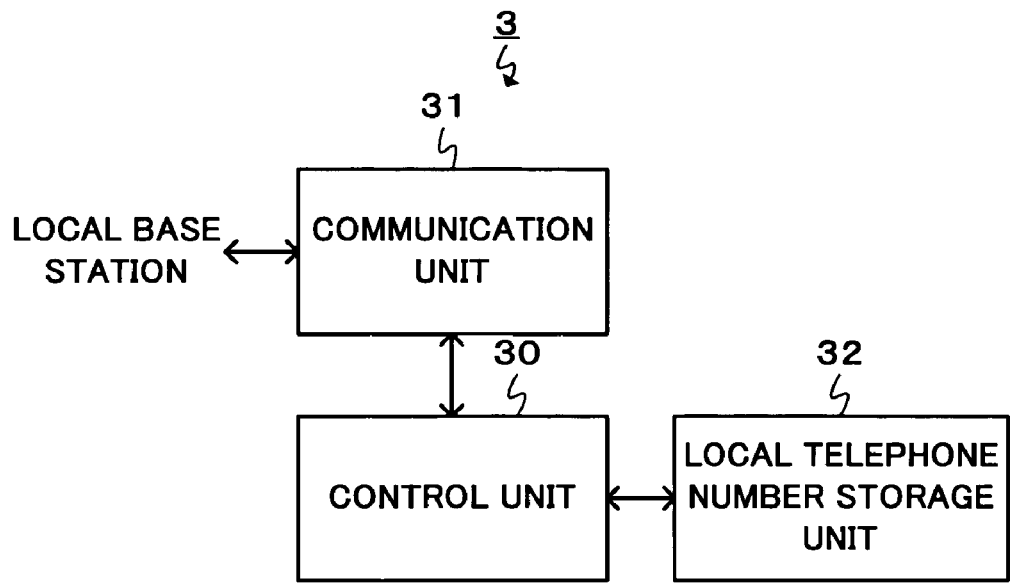
FIG. 3 is a block diagram illustrating an example of the configuration of the local wireless service authentication server shown in FIG. 1.

FIG. 3 is a block diagram illustrating an example of a configuration of the local wireless service authentication server 3. The local wireless service authentication server 3, as shown in FIG. 3, comprises a control unit 30, a communication unit 31, and a local telephone number storage unit 32.

The control unit 30, similarly to the control unit 10, comprises a CPU, a ROM, and a RAM, and so forth, and controls operation of each unit of the local wireless service authentication server 3.

The communication unit 31 enables communication to and from the mobile communication terminal 1.

Figure 4:
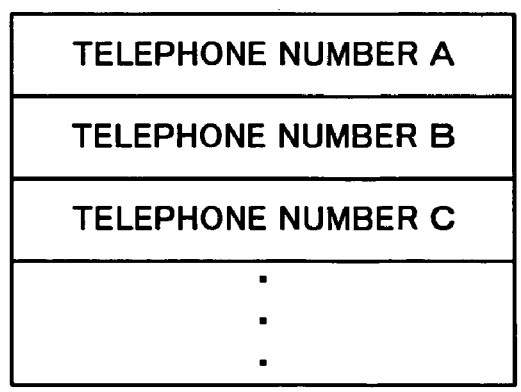
FIG. 4 is an example of the configuration of data in a local telephone number storage unit shown in FIG. 3.

The local telephone number storage unit 32 comprises, for example, a hard disk device or the like, and as shown in FIG. 4, stores the telephone number of the mobile communication terminal 1 that can receive a local wireless service, as identification information thereof.

The mobile services switching center 4 shown in FIG. 1 comprises a Home Location Register (HLR) that stores location information of the mobile communication terminal 1, and sequentially updates location information (PA number) held in the HLR in accordance with a registration request from the mobile communication terminal 1, thereby managing a current location of the mobile communication terminal 1.

Next, there will be described specific operations of the local wireless service providing system having the above-described structure.

Figure 5:
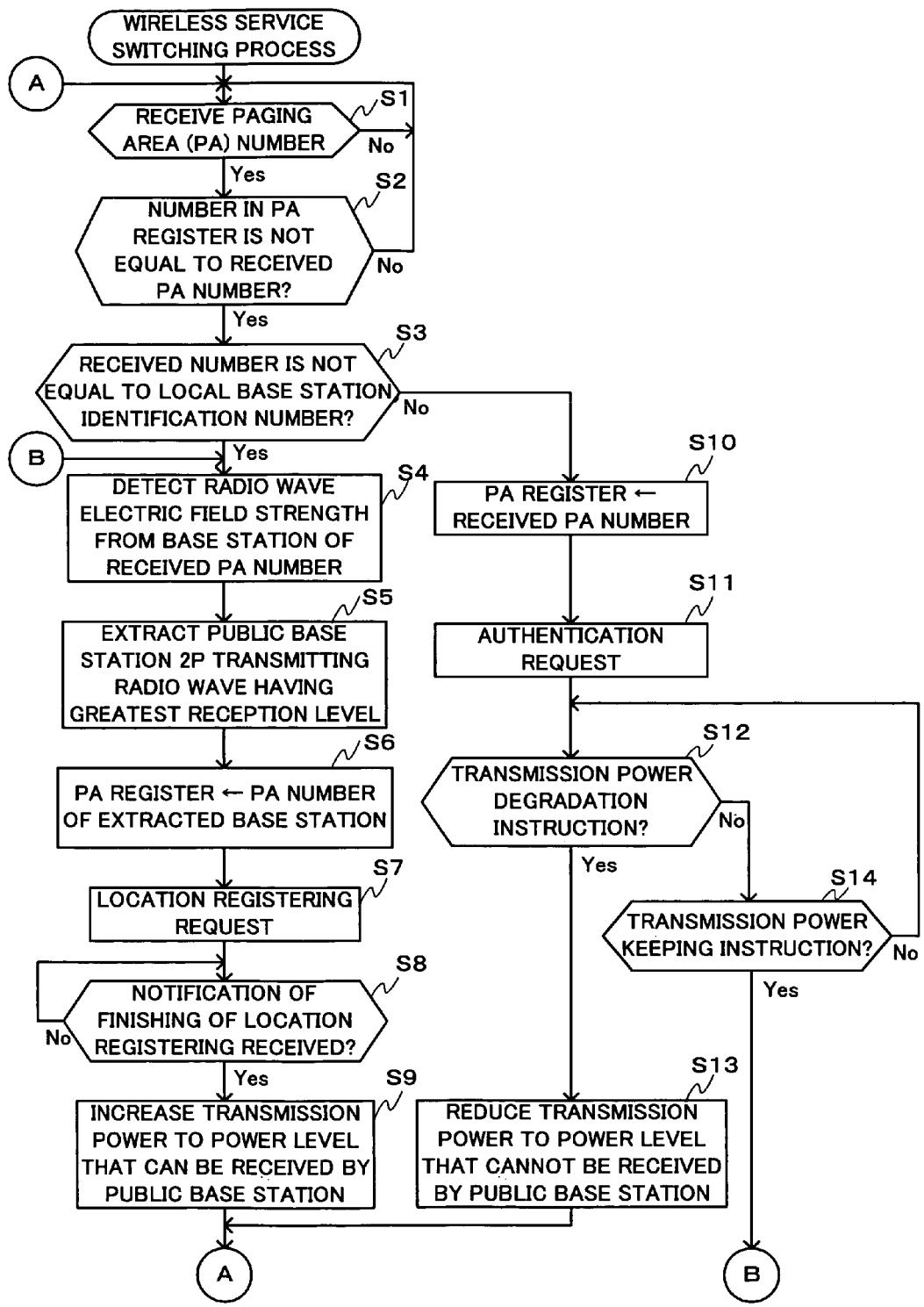
FIG. 5 is a flowchart illustrating details of wireless service switching process in the mobile communication terminal shown in FIG. 2.

To begin with, a wireless service switching process executed by the mobile communication terminal 1 is described with reference to drawings. FIG. 5 is a flowchart illustrating details of the wireless service switching process.

The control unit 10 of the mobile communication terminal 1 receives a paging area (PA) number transmitted at all time by the public base stations 2P and the local base station 2L (Yes at step S1) and compares the received PA number with a PA number stored in the PA register 191, and determines whether the PA number is changed (step S2). When determining that the PA number is not changed (No at step S2), the control unit 10 determines that the mobile communication terminal 1 has not moved to another adjacent base station area, returning to the process of step 1 to wait for next reception of the PA number.

On the contrary, when determining that the PA number is changed (Yes at step S2) the control unit 10 determines that the mobile communication terminal 11 has moved to another adjacent base station area and then compares the PA number received at the process of step 1 with the local base station identification number stored in the local base station identification information storage unit 192 to determine which of a public wireless area and a local wireless area the mobile communication terminal 1 has moved to (step S3).

When the result of the determination process of the above-described step 3 is that the mobile communication terminal 1 has moved from a predetermined public wireless area to another public wireless area (Yes at step S3), the control unit 10 executes so-called handover processing (steps S4 to S9). This handover processing is a process to switch public base stations to be connected so as to make a switch from the public base station 2P (local base station) that constitutes a public wireless area at an origination to a public base station 2P that constitutes a public wireless area at a destination.

To be more specific, a radio wave transmitted by each of an adjacent plurality of base stations (public base stations 2P and local base stations 2L) is received firstly, and, every time the electric field strength of received each radio wave is detected, a value of electric field strength is temporarily stored in an internal RAM of the control unit 10 (step S4). Next, the control unit 10 determines a public base station 2P that transmits a radio wave having the greatest value of electric field strength of the values stored at the process of step 4 (step S5), and stores the PA number received at the reception process of the above-described step S1 in the PA number register 191 (step S6). Then, the control unit 10 sends the PA number in the PA number register 191, from the public base station 2P determined at the determination process of step S5 to the mobile services switching center 4, as well as sending a request for location registering (step S7).

The mobile services switching center 4, receiving the request from the mobile communication terminal 1, rewrites current location information of the mobile communication terminal 1 held in the home location register HLR, namely a PA number, into a PA number contained in the request. The mobile services switching center, on finishing the rewrite, transmits a signal to notify the finish of location registering to the mobile communication terminal 1.

Then, when receiving the signal to notify the finish of location registering sent from the mobile services switching center 4 (Yes at step 8), the control unit 10 controls the public network connection control unit 13 to set the transmission power level of the wireless unit 12 to a level that it can received by the public base station 2P (step S9). After that, the operation goes back to the PA number reception process of step S1.

On the contrary, when determining that the mobile communication terminal 1 has moved from a public wireless area to a local wireless area, as a determination result of the determination process of above-described step S3 (No at step S3), the control unit 10 stores the PA number received at the process of step S1 in the PA register 191 (step S10). Then, the control unit 10 transmits the telephone number of the mobile communication terminal 1 itself to the local wireless service authentication server 3 to request an authentication of whether or not the mobile communication terminal 1 itself is such mobile communication terminal 1 as can receive the local wireless service (step S111). Receiving the authentication request, the later-described terminal authentication process is executed in the local wireless service authentication server 3.

Then, when receiving a transmission power level degrading instruction signal to instruct to reduce the transmission power level from that local wireless service authentication server 3 which has executed the terminal authentication process (Yes at step S12), the control unit 10 determines that the above-described authentication of the terminal is obtained and controls the public network connection control unit 13 to reduce output level of the transmission power in the wireless unit 12, so that the level of the radio wave from the mobile communication terminal 1 is reduced to a level that it can be received by the local base station 2L while it cannot be received by the public base station 2P (step S13). At this time, the radio wave from the public base station 2P reaches the mobile communication terminal 1, however, the radio wave from the local base station 21 is stronger than the radio wave from the Public wireless base station 2P, therefore the mobile communication terminal 1 cannot communicate with the public base station 2P.

Then, when finishing the above-described transmission power reduction process at step S13, the operation returns to the process of step S1.

Contrarily, when the control unit 10 receives a transmission power level keeping instruction signal for instructing to keep the transmission power level from the local wireless service authentication server 3 that has received the authentication request sent from the control unit 10 at step 11 and performed the authentication (No at step S2; Yes at Step S14), the control unit 10 determines that the above-described authentication cannot be obtained, returning back to the process of step S4 to execute the processing of steps S4 to S9, namely the handover processing.

Further, when receiving neither the transmission power reduction instruction (No at step S12) nor the transmission power keeping instruction (No at step S14), the control unit 10 returns to the process of the step S12 to wait for receiving either of the signals.

The processing up to the above is the wireless service switching process in the mobile communication terminal 1.

Figure 6:
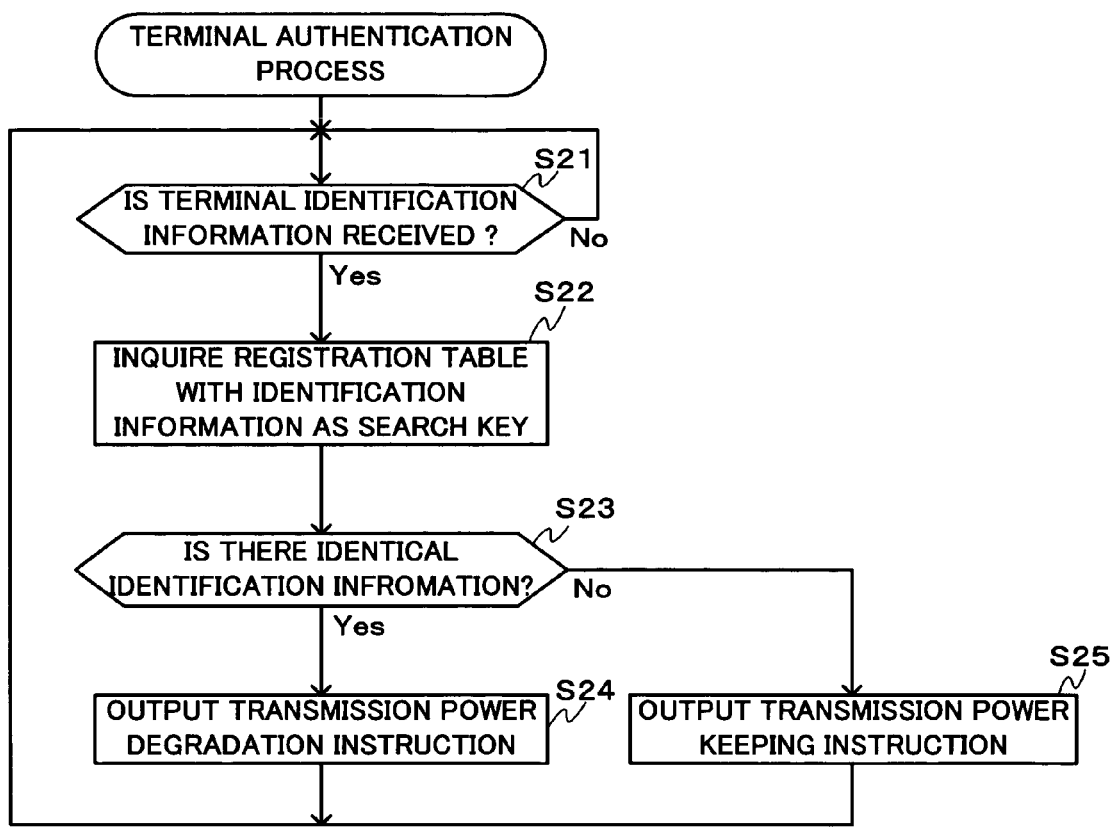
FIG. 6 is a flowchart illustrating details of a terminal authentication process in the local wireless service authentication server shown in FIG. 3.

Next, there will be described a terminal authentication process which the local wireless service authentication server 3 executes in response to the authentication request at step S11. FIG. 6 is a flowchart illustrating the terminal authentication process.

The control unit 30 of the local wireless service authentication server 3 waits for receiving an authentication request from the mobile communication terminal 1 via the communication unit 31 (step S21). The authentication request includes the telephone number (terminal identification information) of the mobile communication terminal 1. When receiving the authentication request (Yes at step S21), the control unit 30 determines whether the telephone number of the mobile communication terminal 1 contained in the authentication request is registered in the local telephone number storage unit 32 (step S22). In other words, it is determined whether the mobile communication terminal 1 can receive the local wireless service.

At the above-described step S22, when it is determined that the telephone number of the mobile communication terminal contained in the authentication request is registered in the local telephone number storage unit 32 (Yes at step S23), the control unit 30 determines that the mobile communication terminal 1 that has requested the authentication can receive the local wireless service, and transmits a transmission power level degrading instruction signal to the mobile communication terminal 1 in order to restrict data transmission of the mobile communication terminal 1 to the public base station 2P (step S24).

On the other hand, at the determination process of above-described step S21, when it is determined that the telephone number of the mobile communication terminal 1 contained in the authentication request is not registered in the local telephone number storage unit 32 (No at step S23), the control unit 30 determines that the mobile communication terminal 1 that has requested the authentication cannot receive the local wireless service, and sends a transmission power level keeping signal to the mobile communication terminal 1 (step S25).

After the processing of steps S24 and S25, the control unit 30 returns to the process of step S21 in order to wait for a new request for authentication from the mobile communication terminal 1.

The process up to the above is the terminal authentication process in the local wireless service authentication server 3.

As described above, when determining that the mobile communication terminal has moved from a public wireless area to a local wireless area, the control unit 10 of the mobile communication terminal 1 transmits the telephone number of the terminal 1 to the local wireless service authentication server 3 to inquire whether the terminal 1 can receive the local wireless service.

In response to the inquiry from the mobile communication terminal 1, the control unit 30 of the local wireless service authentication server 3 judges whether the telephone number of the mobile communication terminal 1 itself is registered in the local telephone number storage unit 32.

When the telephone number is registered in the local telephone number storage unit 32, the control unit 30 determines that the mobile communication terminal 1 is a registered terminal that can receive the local wireless service and transmits a transmission power level signal reduction instruction signal to the mobile communication terminal 1.

When the mobile communication terminal 1 receives the transmission power level reduction instruction signal from the local wireless service authentication server 3, the public network connection control unit 13 of the mobile communication terminal 1 reduces the transmission power of the wireless unit 12 to a level that it can be received by the local base station 2L while it cannot be received by the public base station 2P. In this way, the mobile communication terminal 1 restricts communication that receives the public wireless network.

Accordingly, the mobile communication terminal 1 of the present embodiment can disable, when the local wireless service that utilizes a local wireless service is started, only such communication that uses the public wireless network can be disabled.

Further, it is possible to keep a communication cost from exceeding a fixed amount by performing communication between mobile communication terminals utilizing a local wireless network.

Further, the communication using a local wireless network can effect reduced power consumption of the mobile communication terminal 1.

Second Embodiment

Next, there will be described a local wireless service providing system according to the second embodiment of the present invention. In this embodiment, for the configurations or the processing which are the same as those of the above-described embodiment, the same notations are assigned and explanation therefor is omitted where appropriate.

Figure 7:
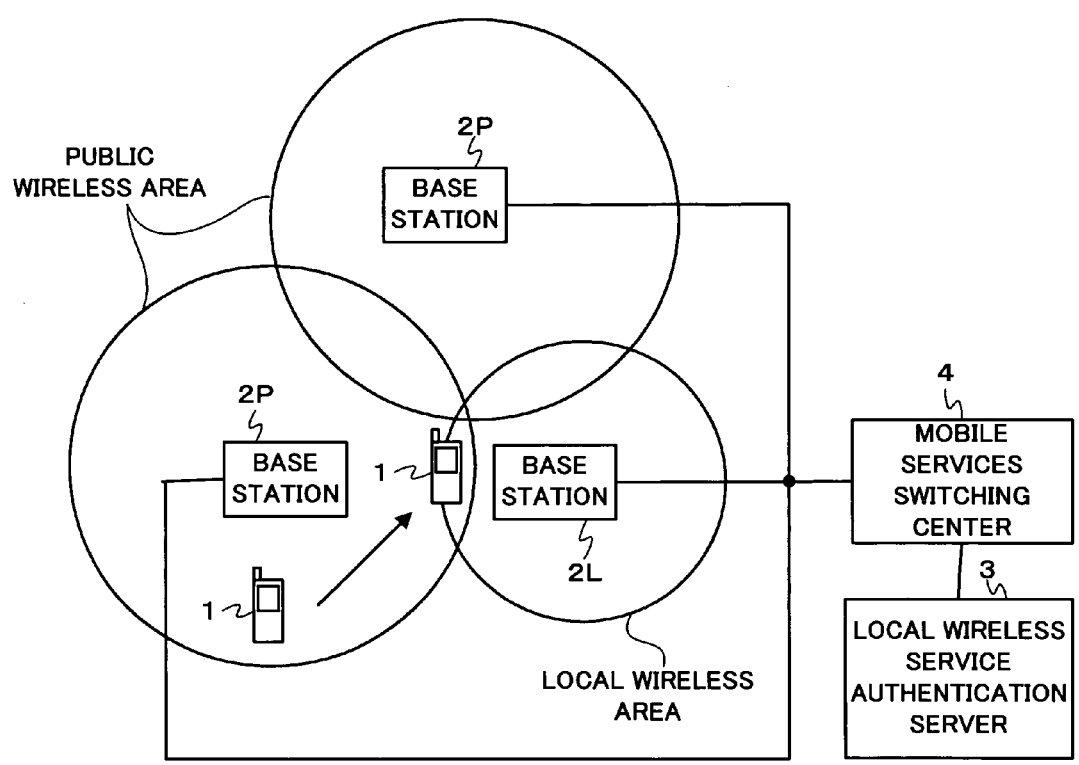
FIG. 7 is a block diagram illustrating an example of the configuration of a local wireless service providing system according to the second embodiment of the present invention.

FIG. 7 is a block diagram showing a specific configuration of the local wireless service providing system according to the second embodiment of the present invention. As shown in FIG. 7, both of the public base stations 2P and the local base station 2L are connected to the mobile services switching center 4, to which a local wireless service authentication server is further connected, which effects a centralized management of a plurality of local base stations 2L in the local wireless service authentication server 3 of the present embodiment.

Figure 8:
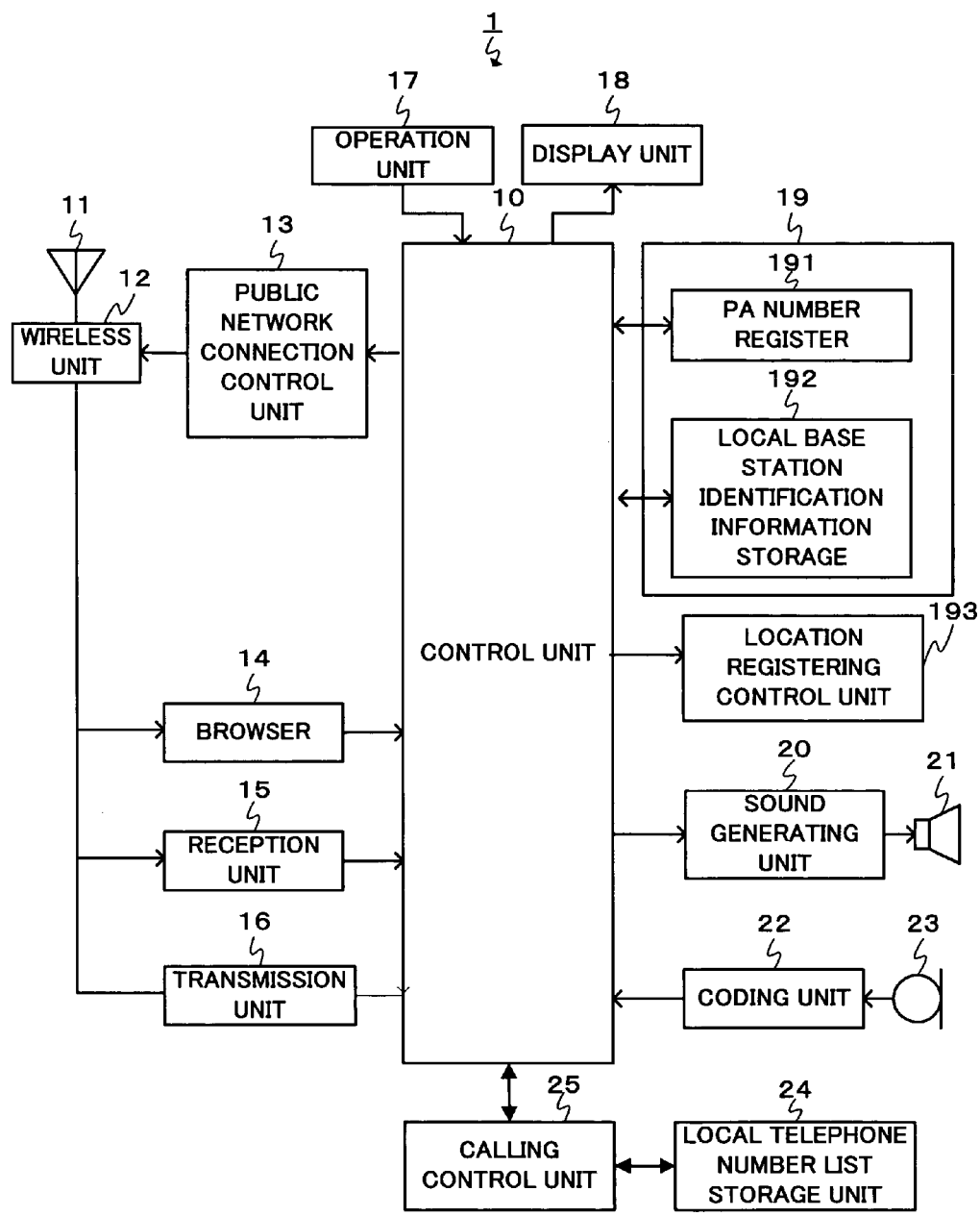
FIG. 8 is a block diagram illustrating an example of the configuration of the mobile communication terminal shown in FIG. 7.

FIG. 8 is a block diagram illustrating an example of a configuration of the mobile communication terminal 1 according to the second embodiment of the present invention. As shown in FIG. 8, the mobile communication terminal 1, in addition to the configuration of the mobile communication terminal 1 in the first embodiment, further comprises a local telephone number list storage unit 24 and a calling control unit 25.

The local telephone number list storage unit 24 is structured of, for example, an SD memory card, etc. and stores a list of telephone numbers (local telephone number list) of mobile communication terminals 1 that can receive the local wireless service.

The calling control unit 25, when the unit 25 itself is using the local wireless service, restricts calling to a mobile communication terminal that cannot receive the local wireless service. Specifically, when a telephone number input through the operation unit 17 is not included on the local telephone number list stored in the local telephone number list storage unit 24, the number is regarded as a non-registered number that cannot receive the local wireless service, and calling to the mobile communication terminal that corresponds to the telephone number is restricted.

Figures 9, 10A, 10B:
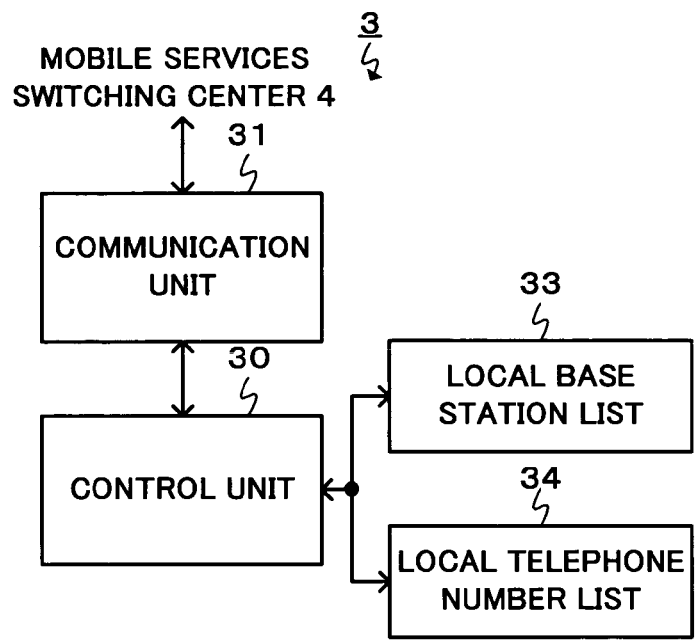
FIG. 9 is a block diagram illustrating an example of the configuration of the local wireless service authentication server shown in FIG. 7.
FIG. 10A is a diagram illustrating an example of the configuration of data of local base station list shown in FIG. 9.
FIG. 10B is a diagram illustrating an example of a configuration of data of local phone number list.

FIG. 9 is a block diagram illustrating an example of a configuration of the local wireless service authentication server 3 according to the second embodiment of the present invention. The local wireless service authentication server 3, as shown in FIG. 9, comprises a control unit 30, a communication unit 31, a local base station list 33, and a local telephone number list 34.

The local base station list 33 is stored in, for example, a hard disk device, etc. (not shown) of a local wireless service authentication server 3, and includes identification numbers of local base stations 2L that can provide the local wireless service, as shown in FIG. 10A.

A plurality of local telephone number lists 34, similarly to the local base station list 33, are held in a hard disk device, etc. of the local wireless service authentication server 3 and are provided in association with respective items of base station identification numbers of the local base station list 33. A local telephone number list 34, as shown in FIG. 10B, includes telephone numbers of mobile communication terminals that can receive the local wireless service in a local base station 2L denoted by its associated base identification number.

The following describes specific operations of the local wireless service providing system comprising the above-described structure.

To begin with, the handover processing executed by the mobile communication terminal 1 is explained.

Figure 11:
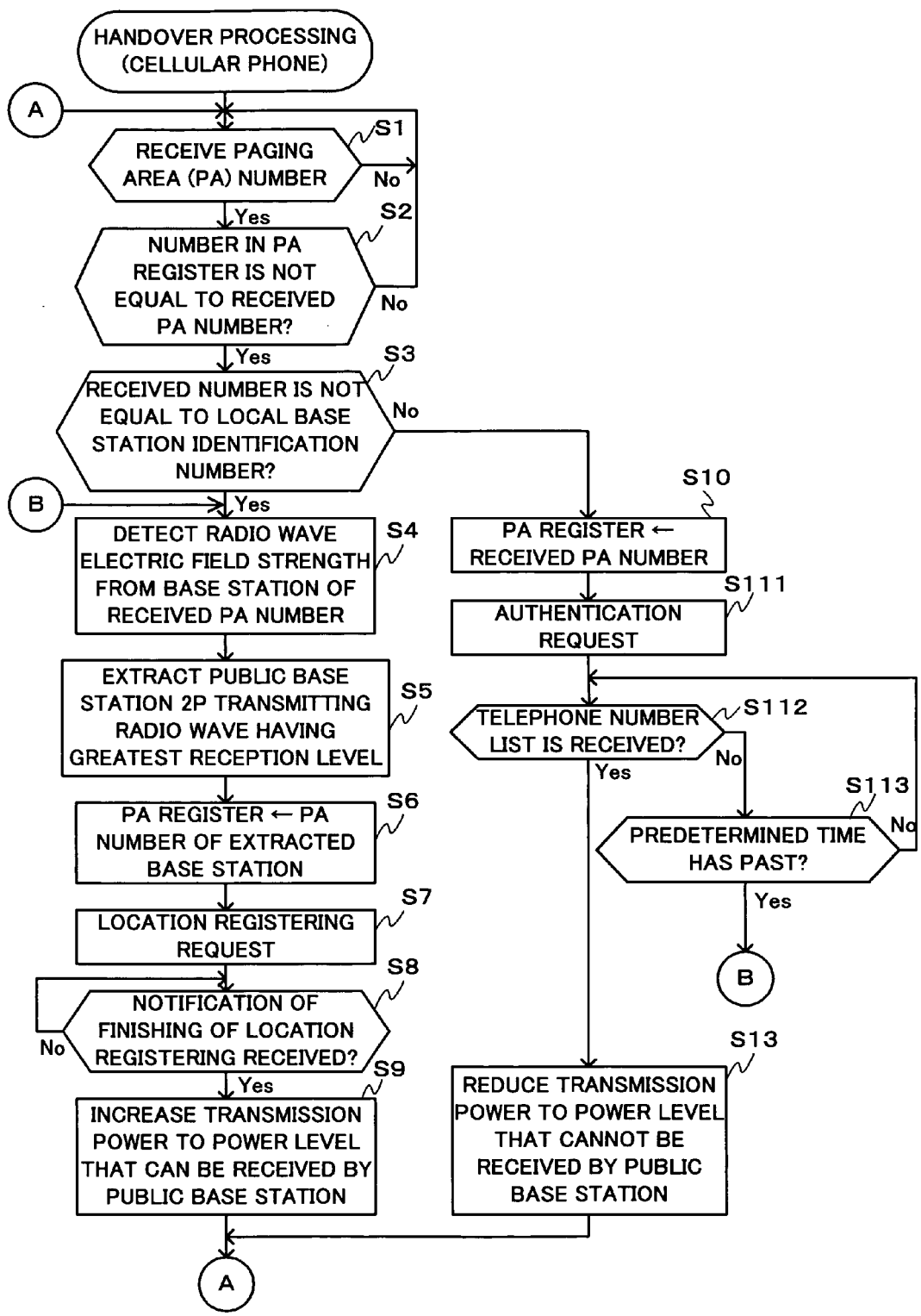
FIG. 11 is a flowchart illustrating details of handover processing in the mobile communication terminal shown in FIG. 8.

FIG. 11 is a flowchart illustrating details of the handover processing. The control unit 10 of the mobile communication terminal 1, after the execution of the processes of steps S1 to S2, when determining Yes at the process of step S3 (Yes at step S3), executes steps S4 through S9, and after that returns to the process of step S1 without changing the transmission power level in the wireless unit 12.

On the contrary, when determining No at the process of step S3, (No at step S3), the control unit 10 executes the process of step S10 and after that transmits a request for location registering that includes telephone number of itself and local base station identification information stored in the local base station identification information storage unit 192 to the mobile exchange center 4, thereby registering its location in the mobile services switching center 4. Based on the received telephone number and the local base station identification information, the mobile services switching center 4 registers the location, and performs authentication inquiry about whether the requester of the location registering is a mobile communication terminal that can receive the local wireless service on the local wireless service authentication server 3 connected to the mobile services switching center 4 (step S111).

In response to the inquiry of the terminal authentication, the local wireless service authentication server 3 performs terminal authentication, and performs outputting in accordance with the authentication result to the mobile services switching center 4. This terminal authentication process will be described later.

Then, when receiving, from the mobile services switching center 4, the local registered number list including telephone numbers that can receive the local wireless service (Yes at step S112), it is determined that the terminal authentication is obtained, and the received local registered number list is stored in the local registered number list storage unit 24, and after that the public network connection control unit 13 is controlled to reduce output level of transmission power of the radio wave from the mobile communication unit 1 in wireless unit 12 to a level that it can be received by the local base station 21 while it cannot be received by the public base stations 2P (step S13). When the reduction of transmission power is finished, the operation returns to the PA number reception process of step S1.

On the other hand, in a case where a predetermined time passes after that inquiry is made without reception of the local registered number list from the local wireless service authentication server 3 (No at step S112; Yes at step S113), the control unit 10 determines that the mobile communication terminal 1 is an unregistered terminal in the local service area while being unable of utilizing the local service, and returns to the radio wave electric field strength detection process at step S4 to execute the processing of steps S4 through S9, namely the handover processing.

The processing up to the above is the hand over processing executed by the mobile communication terminal 1 according to the second embodiment of the present invention.

Next, a terminal authentication process in the local wireless service authentication server 3 according to the second embodiment of the present invention will be described with reference to drawings.

Figure 12:
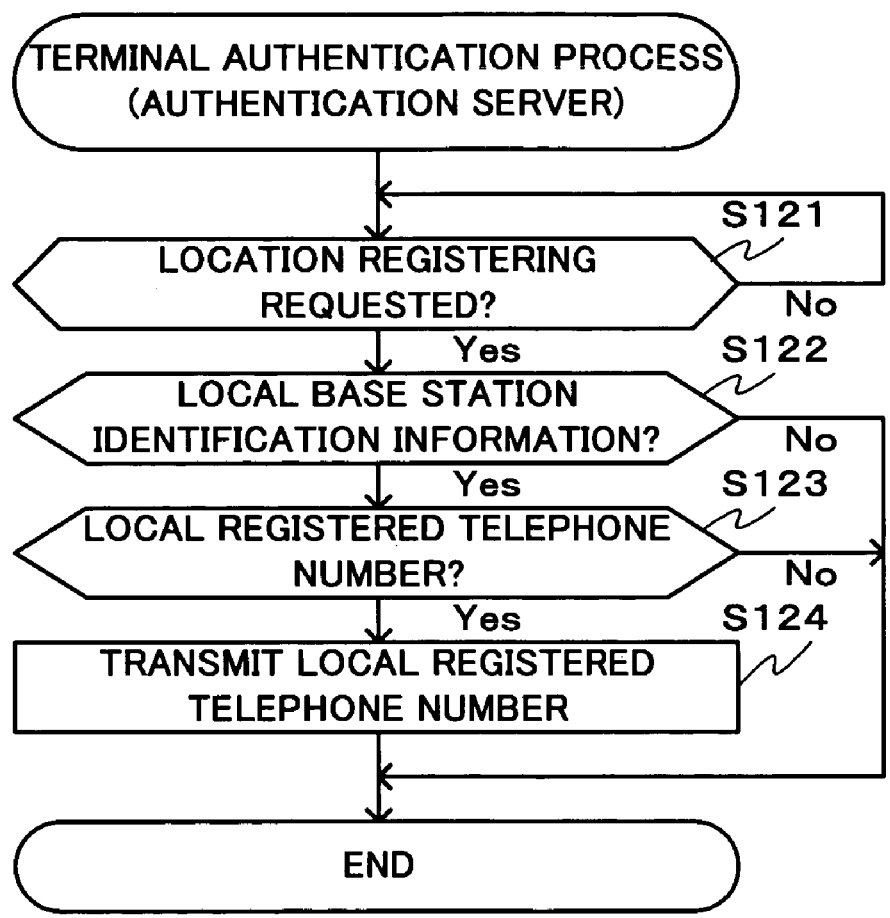
FIG. 12 is a flowchart illustrating details of a terminal authentication process of the local wireless service authentication server shown in FIG. 9.

FIG. 12 is a flowchart illustrating details of the terminal authentication process. In the terminal authentication process, the control unit 30 of the local wireless service authentication server 3, when the communication unit 31 receives a request for location registering from the mobile communication terminal 1 (Yes at step S121), determines whether the request for location registering includes a base station identification number included on the local base station list 33 (step S122).

When determining that a base identification number included on the local base station list 33 is not contained in the request, the control unit 30 directly terminates the terminal authentication process.

Contrarily, when determining that the request includes the base station identification number included on the local base station list 33 (No at step S122), the control unit 30 obtains a local telephone number list 34 associated with this base identification number, and determines whether the telephone number contained in the request for location registering is included on the obtained local telephone number list 34 (step S123).

When determining that the local telephone number list 34 does not include the telephone number (No at step S122), the control unit 30 determines that the mobile communication terminal 1 that has requested location registering cannot receive the local wireless service, and directly terminates the terminal authentication process.

On the other hand, when determining that the local telephone number list 34 includes the telephone number (Yes at step S123), the control unit 30 determines that the mobile communication terminal 1 that has requested the location registering can receive the local wireless service, and transmits the local telephone number list 34 obtained at step 123 to the mobile communication terminal 1 (step S124).

The processing up to the above is the terminal authentication process executed by the local wireless service authentication server 3 according to the second embodiment of the present invention.

Next, there will be described a calling processing in the mobile communication terminal 1 according to the embodiments 1 and 2 of the present invention, with reference to drawings.

Figure 13:
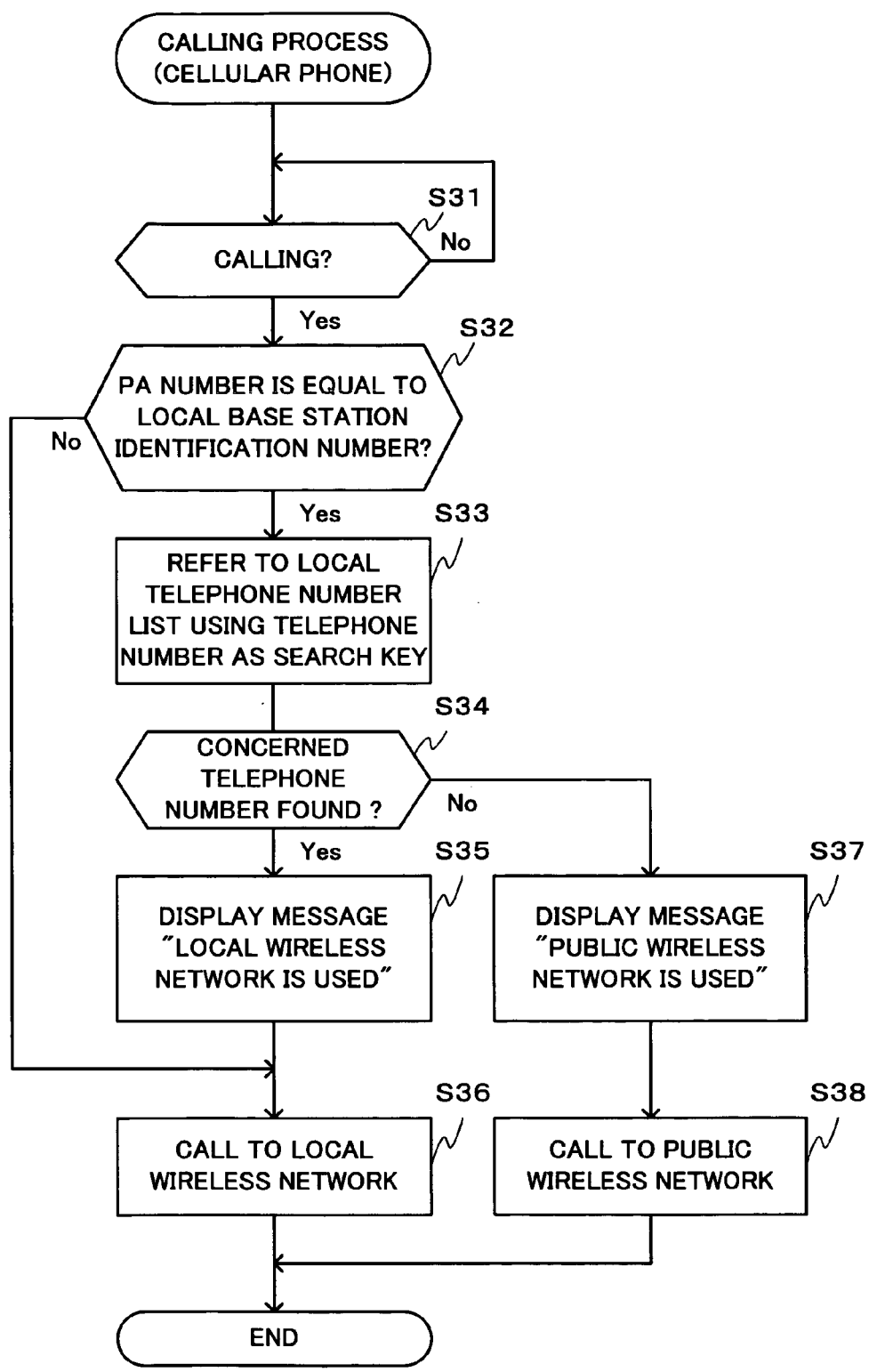
FIG. 13 is a flowchart illustrating details of a calling process in the mobile communication terminal shown in FIG. 2 and FIG. 8.

FIG. 13 is a flowchart showing details of the calling process. When a calling button is pushed after a user inputs a telephone number by the operation unit 17 (yes at step S31), the calling control unit 25 compares the PA number stored in the PA number register 191 and the local base station identification information stored in the local base station identification information storage unit 192 to determine whether the mobile communication terminal 1 is currently in the local wireless area or not (step S32).

When it is determined that the mobile communication terminal 2 is currently not in the local wireless area (No at step S32), the process flows to step S35. Contrarily, when determining that the mobile communication terminal 1 is currently in the local wireless area (Yes at step S32), the calling control unit 25, using the telephone number input at the process of step S31 as a search key, refers to the local telephone number list 34 stored in the local telephone number storage unit 32 in the local wireless service authentication server 3 connected to the local base station 21 or in the mobile communication terminal 1 (step S33).

When the telephone number input at the process of step S31 is detected from the local telephone number list (Yes at step S34), the mobile communication terminal 1 determines that the mobile communication terminal of the telephone number can receive the local wireless service, and displays a message that says the local wireless network can be used (step S35), and calls to a mobile communication terminal corresponding to the input telephone number, using the local wireless network (step S36).

On the contrary, when the input telephone number is not detected from the local telephone number list (No at step S34), the calling control unit 25 determines that the mobile communication terminal corresponding to the input telephone number is an unregistered terminal that cannot receive the local wireless service, displays a massage that says the public wireless service can be used (step S37), and, after that, calls to a mobile communication terminal corresponding to the input number, via the public wireless network (step S38).

The processing up to the above is the calling process executed by the mobile communication terminal 1 according to the embodiments 1 and 2 of the present invention.

As described above, according to the present embodiment, the control unit 10 of the mobile communication terminal 1, when determining that the mobile communication terminal 1 has moved to the public wireless area to the local wireless area based on the received PA number, transmits a request for location registering including the telephone number of the mobile communication terminal 1 and the base station identification number to the mobile services switching center 4 to request location registering, and inquires whether the local wireless network can be used, namely whether the mobile communication terminal 1 can use the local wireless service, to the local wireless service authentication server 3.

The control unit 30 of the local wireless service authentication server 3, in response to the inquire from the mobile communication terminal 1, determines whether the base station identification number contained in the request for location registering is included on the local base list 33.

The control unit 30, when the base identification number is included on the local telephone number list, obtains a local telephone number list 34 associated with the base identification number, and determines whether the telephone number of the mobile communication terminal 1 contained in the request for location registering is included on the obtained local telephone number list 34.

When the telephone number is included on the local telephone number list 34, the control unit 30 determines that the mobile communication terminal 1 is a registered terminal that can receive the local wireless service and transmits the obtained local telephone number list 34 to the mobile communication terminal 1.

When the mobile communication terminal 1 receives the local telephone number list 34, the control unit 10 of the mobile communication terminal 1 stores the local telephone number list 34 to the local telephone number list storage unit 24. In this way, the mobile communication terminal 1 restricts calling to a mobile communication terminal that is not included on the local telephone number list 34 i.e. a mobile communication terminal that cannot perform communication using the local wireless network.

Accordingly, the mobile communication terminal 1 of the present embodiment, when the local wireless service utilizing the local wireless network is started, restricts calling to a mobile communication terminal that cannot perform communication utilizing the local wireless network. Therefore it is possible to disable only communication utilizing the public wireless network.

Further, it is possible to keep a communication cost from exceeding a fixed amount by performing communication between mobile communication terminals utilizing a local wireless network.

Further, the communication using a local wireless network can also have an effect of reducing power consumption or such like of the mobile communication terminal 1.

Because being connected to the mobile services switching center 4, the local wireless service authentication server 3 is capable of receiving requests for authentication in a plurality of kinds of local wireless networks and determining, using the above-described local base station list 33, whether or not to authenticate those that sent the requests. As a result of this, the local wireless service authentication server 3 of the present embodiment enables centralized management of a plurality of local base stations 2L, thereby keeping costs for construction and management of a system low.

Third Embodiment

The following describes a local wireless service providing system according to a third embodiment of the present invention, with reference to drawings. In this embodiment, for the configurations or the processing which are the same as those of the above-described embodiments 1 and 2, the same notations are assigned.

A local wireless service providing system of the present embodiment is a system which, utilizing the art disclosed in the first and second embodiments, enables free communication between a mobile communication terminal in a local area and a mobile communication terminal in a public area.

Figure 14:
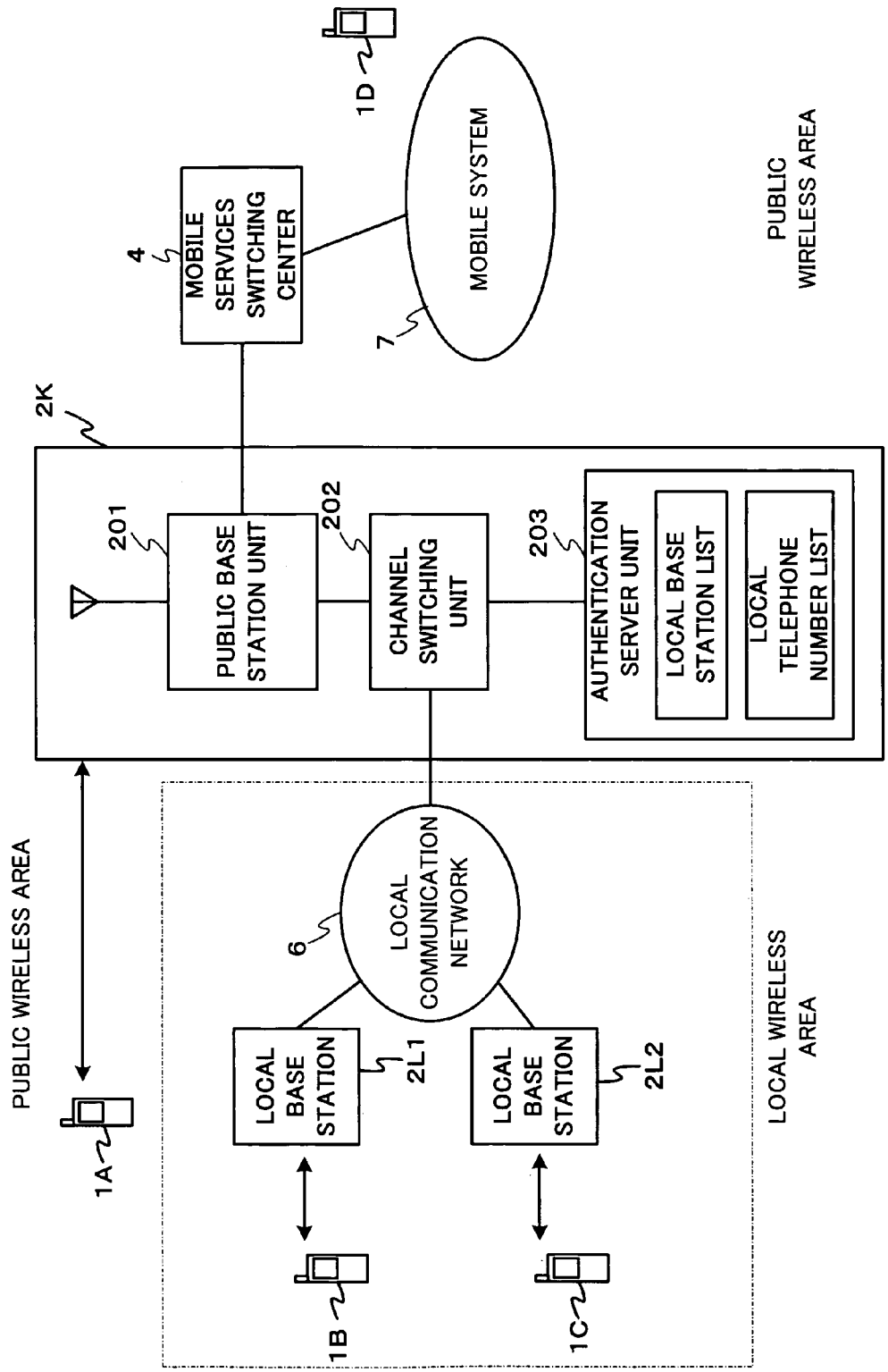
FIG. 14 is a block diagram illustrating an example of the configuration of a local wireless service providing system according to the third embodiment of the present invention.

As shown in FIG. 14, the local wireless service providing system of the present embodiment comprises a local communication system and a public communication system.

The local communication system comprises a plurality of local base stations 2L ($2L_1$ and $2L_2$ in the drawing) and a local communication network 6. The respective local base stations 2L basically comprise the same functions as the local base station 2L in the first and the second embodiments. However, at least one of the local base stations 2L, 2K, has the function of a mediatior between a public communication system and the local communication system, and comprises a public base station unit 201, a channel switching unit 202, and an authentication server unit 203.

Figure 15:
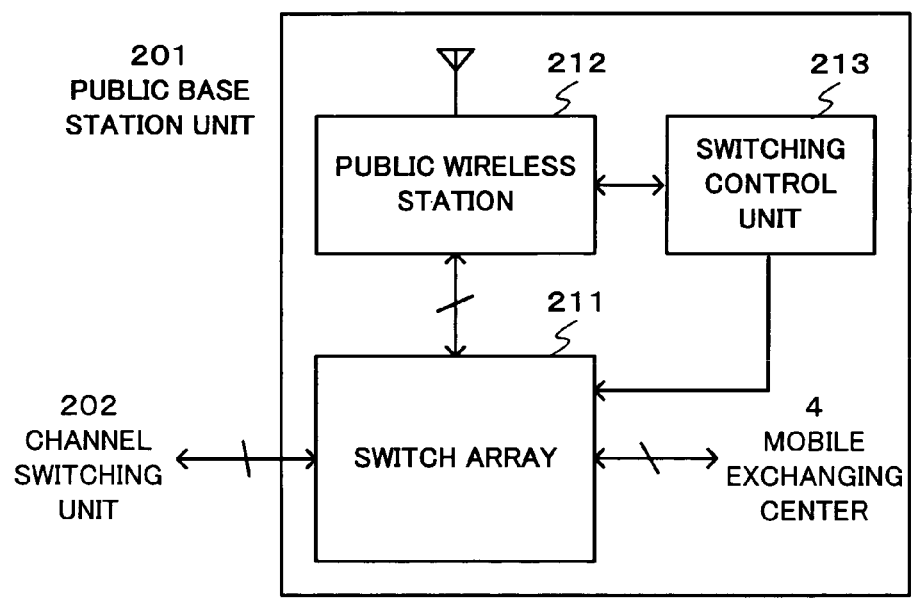
FIG. 15 is a block diagram illustrating an example of the configuration of the public base station shown in FIG. 14.

The public base station unit 201 illustrated in FIG. 14, as shown in FIG. 15, comprises a switch array 211, a public wireless base station 212, and a switching control unit 213, and has a function as an ordinary public base station to communicate to a mobile communication terminal 1 in the public wireless area of the public base station unit 201 itself, and a function to connect the local communication system with the public communication system.

The switch array 211 is constructed of, for example, a crossbar switch array, and switches channels (communication path) to and from the channel switching unit 202, the mobile exchange center 4, and the public wireless base station 212 in accordance with a control of the switching control unit 213.

The public wireless base station 212 comprises the same configuration as the public base station 2P in the above-described FIGS. 1 and 7 and communicates with a mobile communication terminal 1 within the public wireless area of itself.

The public wireless base station 212 has a list of telephone numbers of mobile communication terminals 1 within its public wireless area stored therein.

The switching control unit 213 controls the switch array 211 in accordance with a location of a the mobile communication terminal of an originating end of communication and a location of a mobile communication terminal at the other end of the communication.

Figure 17:
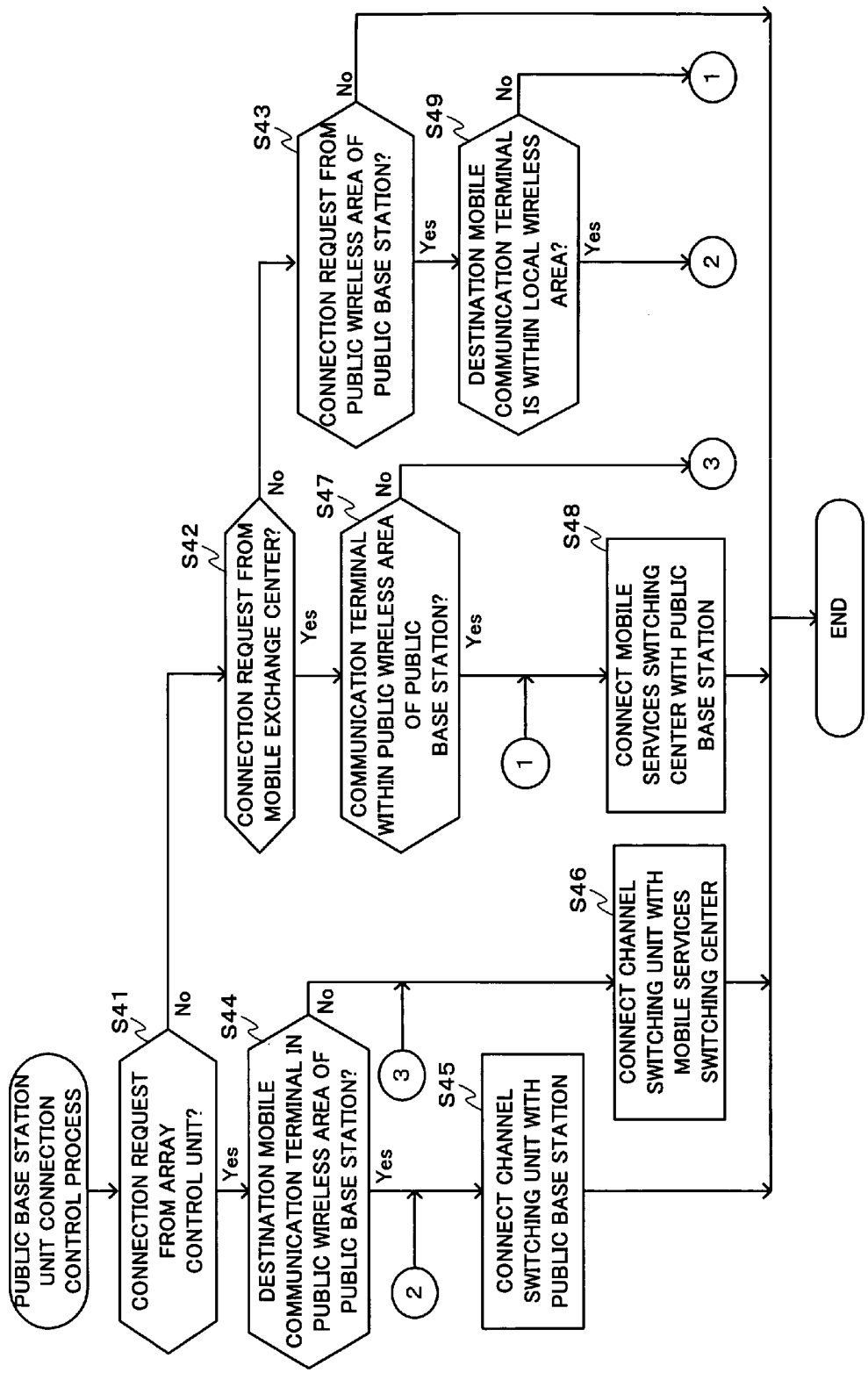
FIG. 17 is a flowchart illustrating an operation example of the public base station unit shown in FIG. 14.
Figure 18:
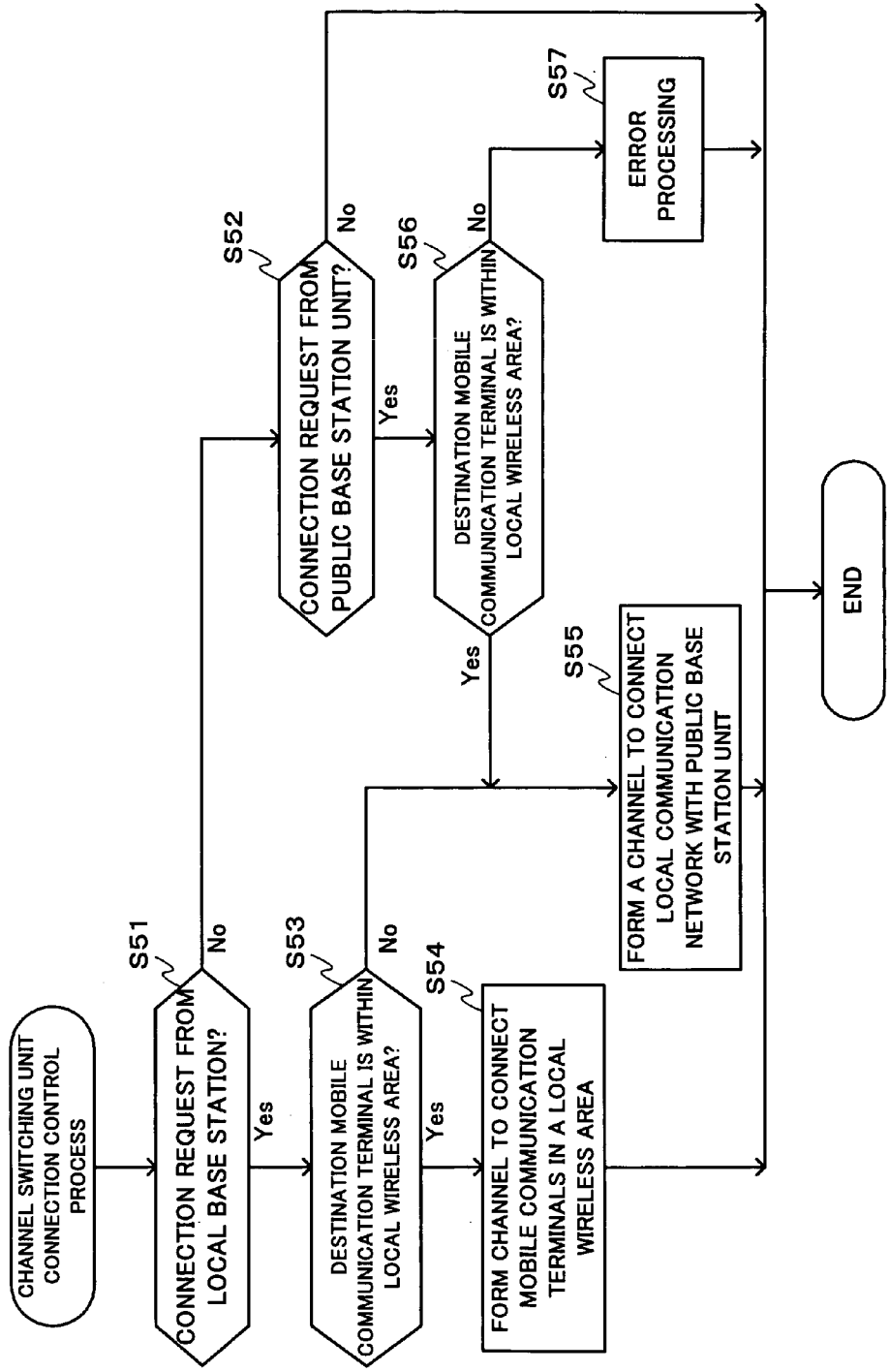
FIG. 18 is a flowchart illustrating an operation example of the channel switching unit shown in FIG. 14.

Specifically, as shown in FIG. 17, the switching control unit 213, when receiving a connection request, determines from which unit the connection request was received: the channel switching unit 202 (the request is provided via the channel switching unit) (step S41), mobile services switching center 4 (the request is provided via the mobile services switching center 4) (step S42), or a mobile communication terminal within the public wireless area of the public base station (step S43).

When determining that the connection request is received from the channel switching unit 202 (Yes at step S41), the switching control unit 213 determines whether the destination mobile communication unit is within the public wireless area of the public wireless base station 212 (step S44). When determining that the mobile communication terminal at a destination end of communication is within the public wireless area of the public wireless base station 212 (Yes at step S44), the switching control unit 213 controls the switch array 211 to connect the public wireless base station 212 and the channel switching unit 202 (step S45). When determining that the mobile communication terminal at a destination end of the communication is not within the public wireless area of the public wireless base station 212 (No at step S44), the switching control unit 213 controls the switch array 211 to connect the channel switching unit 202 with the mobile switching unit 204 (step S46).

When determining that the connection request is from the mobile services switching center 4 (Yes at step S42), the switching control unit 213 determines whether the location of the mobile communication terminal at the destination end of communication is within the public wireless area of the public wireless base station 212 (step S47). When determining that the destination mobile communication terminal is within the public wireless area of the public wireless base station 212 (Yes at step S47), the switching control unit 213 controls the switch array 211 to connect the mobile services switching center 4 with the public wireless base station 212 (step S48). When determining that the destination mobile communication terminal is not within the public wireless area of the public wireless base station 212 (No at step S47), the switching control unit 213 connects the channel switching unit 202 with the mobile services switching center 4 (step S46).

When determining that the connection request is from a mobile communication terminal within the public wireless area of the public wireless base station 212 (Yes at step S43) the switching control unit 213 determines whether the mobile communication terminal at the destination end of communication is within the public wireless area of the public wireless base station 212 (step S49). When determining that the mobile communication terminal at the destination end of communication is within the public wireless area of the public wireless base station 212 (Yes at step S49), the switching control unit 213 connects the channel switching unit 202 with the public wireless base station 212 (step S45). When determining that the location of the destination mobile communication terminal is not within the local wireless area (No at step S49) the switching control unit connects the public wireless base station 212 with the mobile services switching center 4 (step S48).

Figure 16:
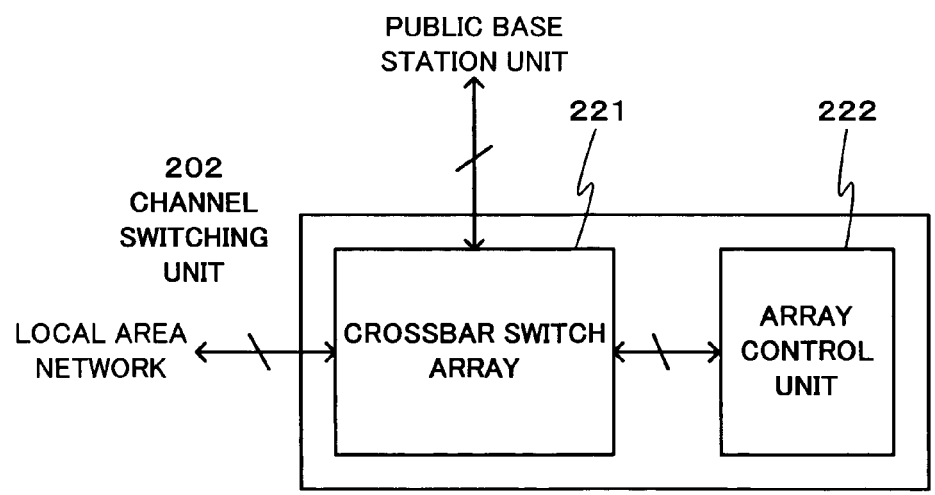
FIG. 16 is a block diagram illustrating an example of the configuration of the channel switching unit shown in FIG. 14.

That is, the switching control unit 213, (1) when a mobile communication terminal within the local wireless area communicates with a mobile communication terminal within a public wireless area, controls the switch array 211 to switch the communication channel so as to enable communication between the channel switching unit 202 and the public wireless base station 212; (2) when a mobile communication terminal within a local wireless area communicates with a mobile communication terminal on a mobile system, controls the switch array 211 to switch the communication channel so as to enable communication between the channel switching unit 202 and the mobile services switching center 4 to switch the communication channel; and (3) when the mobile communication terminal within the public wireless area of the public wireless base station 212 communicates with a mobile communication terminal on a mobile system, controls the switch array 211 to switch the communication channel so as to enable communication between the public wireless base station 212 and the mobile services switching center 4. The channel switching unit 202, as shown in FIG. 16, comprises a cross bar switch array 221 and an array control unit 222 and controls a communication channel between mobile communication terminals.

The crossbar switch array 221 is a matrix array of a crossbar switch. The array control unit 222 controls the crossbar switch array 221 to switch the communication channel (communication path) in accordance with a positional relationship between mobile communication terminals which communicate with each other.

More specifically, the array control unit 222, when receiving a connection request, determines which of the local base station 2L (step S51) or the public base station unit 201 sent the connection request (step S52).

The array control unit 222, when determining that the connection request is from the local base station 2L (Yes at step S51), determines whether the location of a destination mobile communication terminal is within the local wireless area by inquiring of the authentication server unit 203 (step S53). The array control unit 222, when determining, based on the response from the authentication server unit 203, that the mobile communication terminal at the destination end of communication is within the local wireless area (Yes at step S53), controls the crossbar switch array 21 to form a communication channel so as to connect the two mobile communication terminals communicating with each other (step 54).

The array control unit 222, when determining, based on the response from the authentication server unit 203, that the mobile communication terminal at the destination end of communication is not within the local wireless area (step S53; No), controls the crossbar switch array 221 to form a communication channel so as to connect the local communication network 6 with the public base station unit 201 (step S55).

The array control unit 222, when determining that the connection request is from the public base station unit 201 (Yes at step S52), determines whether the mobile communication terminal at the destination end of communication is within the local wireless area by inquiring with the authentication server unit 203 (step S56). The array control unit 222, when determining, based on the response from the authentication server unit 203, that the location of the mobile communication terminal at the destination end of communication is within the local wireless area (Yes at step S56), controls the crossbar switch array 221 to form a communication channel so as to connect the local communication network 6 with the public base station unit 201 (step S55).

The array control unit 222 when determining, based on the response from the authentication server unit 203, that the destination mobile communication terminal is not within the local wireless area (No at step S56), executes appropriate error processing (step S57).

That is, (1) when both of two mobile communication terminals communicating with each other are within a local wireless area, the array control unit 222 controls the crossbar switch array 221 to form a communication channel such that the both communication terminals are connected with each other, and (2) when one of two communication terminals communicating with each other is within the local wireless area, and the other is in a public wireless area, the array control unit 222 controls the crossbar switch array 221 to connect the local communication network 6 with the public base station unit 201.

The authentication server unit 203 has a substantially same configuration as the local wireless service authentication server 3 in the second embodiment, and has a list of local base stations 2L1, 2L2, and 2K that constitutes the local wireless communication system, and a list of telephone numbers of mobile communication terminals 1 within the local wireless area stored therein.

Note that each of the local base stations 2L, the array control unit 222 of the channel switching unit 202, and the switching control unit 213 are connected by a control communication line.

The following describes an operation of a mobile communication system having such configuration.

Firstly, the following description is provided on the assumption that, as shown in FIG. 14, the mobile communication terminal 1A is within an area covered by the public base station unit 201 of the local base station 2K (public wireless area); a mobile communication terminal 1B is within a local wireless communication area of a local base station 2L1; the mobile communication terminal 1C is within a local wireless communication area of a local base station 2L2; and a mobile communication terminal 1D is on a mobile system 7. In this case, in the mobile services switching center 4, terminal identification information (telephone number) which shows that the mobile communication terminal 1A 1B, 1C belong to the wireless base station 2K. And in the wireless base station 212, terminal identification information (telephone number) of the mobile communication terminal 1A within the public wireless network of the wireless base station 212 itself is registered, and in the authentication server unit 203 in the local base station 2K, terminal identification information of mobile communication terminals 1B and 1C within the local wireless network area of the local communication network 6.

The following describes an operation of the above-described mobile communication system. The description is divided into cases and the respective cases have specific examples.

(1. Communication to a Mobile Communication Terminal C within a Local Wireless Area of the Local Communication Network from a Mobile Communication Terminal 1B within a Local Wireless Area of the Local Communication Network 6)

The local base station 2L1, when receiving a connection request (communication request) to the mobile communication terminal 1C from the mobile communication terminal 1B, routes the signal to the local base station 2K.

The array control unit 222 of the channel switching unit 202 of the local base station 2K determines Yes at step S51 and Yes at step S53. Then, at step S54, the array control unit 222 inquires of the authentication server unit 203 to determine that a destination mobile communication terminal 1C is within the local wireless area of the local base station 2L2. Then, the array control unit 222 controls the crossbar switching array 221 so as to form a channel from the local base station to the local base station 2L2.

Accordingly, a communication channel connecting the mobile communication terminals 1B and 1C is formed, and after that communication between the mobile communication terminal 1B and 1C is performed in accordance with normal procedures.

(2. Communication from a Mobile Communication Terminal 1A within the Public Wireless Area (However, not within a Local Wireless Area) of the Local Base Station 2K to a Mobile Communication Terminal 1C within the Local Wireless Area)

The switching control unit 213 of the public base station unit 201 of the local base station 2K, when receiving a connection request from a mobile communication terminal 1A to the mobile communication terminal 1C, determines No at steps S41 and S42, and Yes at step S43. Then, the switching control unit 213 inquires of the authentication server unit 203, via the array control unit 222 of the channel switching unit 202, whether the destination mobile communication terminal 1C is within the local wireless area. The authentication server unit 203 determines that the mobile communication terminal 1C is within the local wireless area of the local base station 2L2, and notifies that to the switching control unit via the array control unit 222.

The switching control unit 211, controls the switch array 211 in accordance with the notification, to connect the public base station 2L1 with the channel switching unit 202 (step S46).

On the other hand, the array control unit 222 receives the connection request via the public base station unit 201, and determines No at step S51 and Yes at step S52. Then, the array control unit 222, in accordance with the notification from the authentication server unit 203, determines that the destination mobile communication terminal is within the local wireless area (Yes at step S56), and controls the crossbar switch array 221 to form a channel from the public base station unit 201 to the local base station 2L2 (step S55).

Accordingly, a channel from the public base unit 201 to the local base station 2L2 via the channel switching unit 202 is formed. After that, communication between the mobile communication terminal 1A and 1C is performed in accordance with normal procedures.

(3. Communication from a Mobile Communication Terminal 1A within the Public Wireless Area of the Local Base Station 2K to a Mobile Communication Terminal 1D Outside the Local Wireless Network)

The switching control unit 211 of the public station unit 201 of the local base station 2K, when receiving a connection request from the mobile communication terminal 1A to the mobile communication terminal 1D, determines No at step S41 and step S42, and Yes at step S43. Then, the switching control unit 213 inquires of the authentication server unit 203 whether the mobile communication terminal 1D at the destination end of communication is within the local wireless area. The authentication server unit 203 determines that the mobile communication terminal is not in any one of the local base stations 2L, and notifies that to the switching control unit 213.

The switching control unit 213, in accordance with the notification, determines that the mobile communication terminal at the destination end of communication is not within the local wireless area (No at step S49) and controls the switch array 211 to connect the public base station 212 with the mobile services switching center 4.

Accordingly, a communication channel from the mobile communication terminal 1A to the mobile communication terminal 1D via the mobile services switching center 4 is formed. After that, communication between the mobile communication terminal 1A and 1D is performed in accordance with normal procedures.

(4. Communication from the Mobile Communication Terminal 1B within the Local Wireless Area of the Local Communication Network 6 to the Mobile Communication Terminal 1D within the Public Wireless Area)

The local base station 2L1, when receiving a connection request form the mobile communication terminal 1B to a mobile communication terminal 1D, routs the request to the local base station 2K.

The array control unit 222 of the channel switching unit 202, when receiving the connection request from the mobile communication terminal 1B to the mobile communication terminal 1D, routs the request to the local base station 2K. The array control unit 222 of the channel switching unit 202, when receiving the connection request, determines Yes at step S51. Then, the array control unit 221 inquires of the authentication server unit 203, and determines that the destination mobile communication terminal 1C is not within the local wireless area (No at step S53). Then, the array control unit 222 controls the crossbar switch array 221 so as to form a channel from the local base station 2L1 to the public base station unit 201 (step S55).

On the other hand, the switching control unit 213 of the public base station unit 201, when receiving a connection request via the channel switching unit 202, determines Yes at step S41. Then, the switching control unit 213 inquires with the public base station 211 to determine that the destination mobile communication terminal is not within the public wireless area (No at step S44), and connect the channel switching unit 202 with the mobile switching unit 4 (step S46).

This forms a communication path from the mobile communication terminal 1B to the mobile communication terminal 1D via the local wireless base station unit 2L1, the crossbar switch array 211, the public wireless station unit 201, and the mobile switching unit 4. After that, communication between the mobile communication terminal 1B and 1D is performed in accordance with normal procedures.

(5. Communication from a Mobile Communication Terminal 1D on the Mobile System 7 to a Mobile Communication Terminal 1A within the Public Wireless Area of the Local Base Station 2K)

A connection request from the mobile communication terminal 1D to the mobile communication terminal 1A is routed to the local base station 2K in accordance with data stored in the mobile switching unit 4.

The switching control unit 213 of the public base station unit 201 of the local base station unit 2K, when receiving a connection request, determines No at step S41 and Yes at step S42. The switching control unit 213 inquires with the public base station unit 212 to determine that the destination mobile communication terminal 1D is within the public wireless area of the public base station 212 (Yes at step S47). The switching control unit 213 controls the switch array 211 to connect the mobile services switching center 4 with the public base station 212. Further, the switching control unit 213 controls the public base station 212 to call the mobile communication terminal 1A.

Accordingly, a channel from the mobile communication terminal 1D to the mobile communication terminal 1A via the mobile system 7, the mobile switching unit 4, and the public base station unit 201. After that, communication between the mobile communication terminal 1D and 1A is performed in accordance with normal procedures.

(6. Communication from the Mobile Communication Terminal 1D on the Mobile System 7 to a Mobile Communication Terminal 1C within the Local Wireless Area of the Local Base Station 2L)

A connection request from the mobile communication terminal 1D to 1C is routed to the local base station 2K in accordance with the data stored in the mobile services switching center 4.

The switching control unit 213 of the public base station unit 201 of the local base station 2K, when receiving a connection request, determines No at step S41 and Yes at step S42. Then, the switching control unit 213 inquires of the public base station 212 whether the mobile communication terminal at the destination end of communication is within the public wireless area of the public base station 212. The switching control unit 213, in accordance with the response from the public base station 212, determines that the destination is not within the public wireless are of the public base station 212 (No at step S47), and controls the switch array 211 to connect the channel switching unit 202 with the mobile services switching center 4 (step S48).

On the other hand, the array control unit 222 of the channel switching 202, when receiving the connection request, determines No at step S51 and Yes at step S52. Then, the array control unit 222 inquires of the authentication server 203 whether the destination mobile communication terminal is within the local wireless area. The array control unit 222, based on the response from the authentication server unit 203, determines that the mobile communication terminal at the destination end of communication is within the local wireless area, and determines a local base station 2L2 which covers the local wireless area (step S56). The array control unit 222 controls the crossbar switch array 221 to form a channel from the public base station nit 201 to the local base station 2L2 (step S55).

This forms a communication path from the mobile communication terminal 1D to the mobile communication terminal 1C via the mobile system 7, motile switching unit 4, public wireless station unit 201, crossbar switch array 211, and the local wireless base station 2L2. After that, communication is performed between the mobile communication terminal 1D and 1C in accordance with normal procedures.

The above structure enables (1) communication between mobile communication terminals in a local wireless area, (2) communication between a mobile communication terminal within a local wireless area and a mobile communication terminal within a public wireless area, and (3) communication between mobile communication terminals in a public wireless area, without having influence on a infrastructure.

For the sake of better understanding, FIG. 14 illustrates a configuration in which the local base station 2K does not have a wireless communication facility for local wireless communication. However, the invention is not limited to this configuration, and the local base station 2K may comprise a wireless communication facility for local wireless communication.

Also, in the configuration of the FIG. 14, when a mobile communication terminal outside the local wireless area formed by the local base station 2L or 2K comes into the local wireless area, the mobile communication terminal lowers power of its wireless unit, so that it communicates with the local wireless base station. Further, when a mobile communication terminal within the local wireless area comes out of the local wireless area, the power of the wireless unit is increased, so that the mobile communication terminal communicates with the public wireless station (or the public base station unit).

The present invention is not limited to the above embodiment and various modifications and application can be made. In what follows, there is described variation of the above embodiment applicable to the present invention.

In the above-described first embodiment, when it is determined that, as a response to inquiry from the mobile communication terminal 1, the mobile communication terminal 1 is a registered terminal that can receive the local wireless service, the local wireless service authentication server 3 transmits a transmission power level reduction instruction signal to the mobile communication terminal 1. The mobile communication terminal 1, in response to the signal, controls output level of the transmission power in the wireless unit 12 to a level that cannot be received by the public base station 2P, thereby to restrict communication using the public wireless network.

However, the present invention is not limited to this. For example, a mobile communication terminal 1 used in the second embodiment may be applied to the local wireless service providing system of the first embodiment, and the local wireless service authentication server 3 may transmit telephone numbers stored in advance in the local telephone number storage unit 32 to the mobile communication terminal 1 in the form of a list, when determining that the mobile communication terminal 1 is a registered terminal that can receive the local wireless service, in response to the inquiry from the mobile communication terminal 1, so that calling to a mobile communication terminal that is not included on the telephone number list is restricted, similarly to the second embodiment.

Further, the above-described second embodiment has described that the local wireless service authentication server 3 is connected to a plurality of local base stations 2L via the mobile services switching center 4. However, the present invention is not limited to this, and a plurality of local base stations 2L may be directly connected to the local wireless service authentication server 3. In this case, the mobile communication terminal 1 may transmit a request for authentication to the local wireless service authentication server 3 other than the request for location registering to be transmitted to the mobile services switching center 4.

Further, of course, the configurations of the public network connection control unit 13 and the calling control unit 25, etc. according to the above-described embodiment can be realized by hardware and may be realized by software processing of the control unit 10. In this case, the control unit 10 may be controlled to function as the above-described public network connection control unit 13 and the calling control unit 25, a program for realizing each processing described above may be stored in the mobile communication terminal 1 (for example, in the storage unit 19), and the control unit 10 may execute such program.

Of course, it is possible to provide a mobile communication terminal 1 in which such program is installed in advance, and is possible to make an existing mobile communication terminal to function as the mobile communication terminal 1 according to the above-described embodiments by applying the above-described program to an existing mobile communication terminal. The program can be provided by an arbitrary method. For example, it is possible to provide the program via a communication medium such as the Internet, and besides, for example, it is possible to distribute the program by storing it in a storage medium such as a memory card.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-5055 filed on Jan. 12, 2005 and including specification, claims, drawings and summary. The disclosure of the above Japanese Patent Application is incorporated herein by reference in its entirety.

What is claimed is:

1. A mobile communication terminal comprising:
communication availability determination means which determines whether a second communication network is available, in accordance with movement of the mobile communication terminal from a communication area of a first base station constituting a first communication network to a communication area of a second base station constituting the second communication network which is different from the first communication network;
communication means which performs transmission and reception to enable communications via at least the first communication network; and
restriction means which controls the communication means to restrict communication that uses the first communication network, by controlling transmission power for communication to be reduced to a degree such that the first base station cannot receive a radio wave from the mobile communication terminal but reception by the mobile terminal from the first base station is maintained and the transmission power maintains the communication with the second communication network, when the communication availability determination means determines that the second communication network is available;
wherein the restriction means, when the communication availability determination means determines that a status in which the second communication network is available is changed to a status at which the second communication network is unavailable, controls the transmission power for communication to recover to such a degree that the first base station can be communicated with, so that data transmission using the first communication network is enabled.

2. The mobile communication terminal according to claim 1, wherein the restriction means, when the communication availability determination means determines that the second communication network is available, restricts communication using the first communication network by restricting calling to another mobile communication terminal that cannot use the second communication network.

3. The mobile communication terminal according to claim 1, wherein the restriction means, when the communication availability determination means determines that the second communication network is available, originates a call to a first communication network for another mobile communication terminal that cannot use the second communication network, and originates a call to a second communication network for another mobile communication terminal that can use the second communication network.

4. A mobile communication system comprising:
a first communication network;
a second communication network which is different from the first communication network;
a mobile communication terminal which is configured to perform transmission and reception to enable communication using at least the first communication network; and
an authentication unit which determines whether the mobile communication terminal can use the second communication network,
wherein the mobile communication terminal comprises:
communication inquiry means which, in accordance with movement of the mobile communication terminal from a communication area of a first base station that constitutes the first communication network to a communication area of a second base station that constitutes the second communication network, determines whether the second communication network is available, by sending terminal identification information specific to the mobile communication terminal to the authentication unit; and
restriction means which, when being notified by the authentication unit that the second communication network is available, enables communication that uses the second communication network and restricts communication that uses the first communication network by controlling transmission power to a degree such that the first base station cannot receive a radio wave from the mobile communication terminal but reception by the mobile terminal from the first base station is maintained and the transmission power maintains the communication with the second communication network, so that communication using the first communication network is restricted;
wherein the restriction means, when a communication availability determination means of the mobile terminal determines that a status in which the second communication network is available is changed to a status at which the second communication network is unavailable, controls the transmission power for communication to recover to such a degree that the first base station can be communicated with, so that data transmission using the first communication network is enabled.

5. The mobile communication system according to claim 4, wherein the authentication unit comprises:
terminal identification information storage means which stores terminal identification information identifying a mobile communication terminal that can use the second communication network;
terminal identification information reception means which receives the terminal identification information transmitted by the communication inquiry means;
first terminal identification information determination means which determines whether the terminal identification information received by the terminal identification information reception means is stored in the terminal identification information storage means; and
first inquiry result notification means which, when the first terminal identification information determination means determines that the received terminal identification information is stored in the terminal identification information storage means, an inquiry result being provided to the mobile communication terminal indicating that the mobile communication terminal can use the second communication network.

6. The mobile communication system according to claim 5, wherein the first inquiry result notification means, when the first terminal identification information determination means determines that the received terminal identification information is stored in the terminal identification information storage means, provides an inquiry result indicating that the mobile communication terminal can use the second communication network, by transmitting a transmission power reduction instruction signal that instructs the mobile communication terminal to reduce its transmission power, and the restriction means, when receiving the transmission power reduction instruction signal transmitted by the first inquiry result notification means, controls the transmission power to communicate with the first base station to be reduced to a degree such that the first base station cannot receive the radio wave from the mobile communication terminal and the transmission power maintains the communication with the second communication network, so that communication using the first communication network is restricted.

7. The mobile communication system according to claim 4, wherein the communication inquiry means, in accordance with the movement of the mobile communication terminal from the communication area of the first base station to the communication area of the second base station, transmits second base station identification information identifying the second base station, together with the terminal identification information, to the authentication unit via the second base station;

the authentication unit comprises:
   base station identification information storage means which stores base station identification information that identifies base station of a communication network in which availability of communication can be determined;
   terminal identification information storage means which stores, separately for each base station in which availability of communication can be determined, terminal identification information registered in advance that identifies a mobile communication terminal that can use the network;
   identification information reception means which receives the terminal identification information and the second base station identification information from the communication inquiry means;
   base station identification information determination means which determines whether the base station identification information corresponding to the second base station identification information received by the identification information reception means is stored in the base station identification information storage means;
   terminal identification information obtaining means which, when the base station identification information determining means determines that the corresponding base station identification information is found, obtains terminal identification information corresponding to the second base station identification information from the terminal identification information storage means;
   second terminal identification information determination means which determines whether the terminal identification information obtained by the terminal identification information obtaining means is stored in the terminal identification information storage means; and
   second inquiry result notification means which, when the second terminal identification information determination means determines that the received terminal identification information is stored in the terminal identification information storage means, and provides an inquiry result to the mobile terminal which indicates that the second communication network is available.

8. The mobile communication system according to claim 7, wherein the second inquiry result notification means, when the second terminal identification information determination means determines that the received terminal identification information is stored in the terminal identification information storage means, transmits, to the mobile communication terminal, all the information obtained by the terminal identification information obtaining means, thereby notifying the mobile communication terminal of the inquiry result indicating mobile communication terminals which are able to use the second communication network, and the restriction means, when receiving one or more pieces of terminal identification information transmitted by the second inquiry result notification means, restricts calling to the mobile communication terminal not indicated in the inquiry result, thereby restricting communication using the first communication network.

9. The mobile communication system according to claim 4, further comprising:
   a third base station which constitutes the first communication network; and
   connection switching means which, in response to connection request transmitted from the mobile communication terminal via the third base station, determines a location of a destination end of communication, connects the mobile communication terminal to the first communication network when the destination end of communication is within the first communication network, and connects the mobile communication terminal to the second communication network when the destination end of communication is within the second communication network.

10. The mobile communication system according to claim 9, wherein the connection switching means, in response to a connection request transmitted from the mobile communication terminal via the second communication network, determines a location of a destination end of communication, connects the mobile communication terminal to the third base station when the destination end of the communication is within a communication area of the third base station, and connects the mobile communication terminal to the first communication network when the destination end of the communication is within the first communication network exterior to the communication area of the third base station.

11. The mobile communication system according to claim 9, wherein the connection switching means which, in response to a communication request transmitted from the mobile communication terminal via the first network, determines a location of a destination end of communication, connects to the first communication network when the destination end of communication is within the first communication network, and connects the mobile communication terminal to the destination end of the communication via the third base station when the destination end of the communication is within a communication area of the third base station.

12. The mobile communication system according to claim 9, wherein the connection switching means, based on information stored in the authentication unit, determines whether a destination end of communication is within the second communication network.

13. A mobile communication system having an authentication unit which determines whether a mobile communication terminal connected to a first communication network and a second communication network and capable of performing transmission and reception to enable communication using the first communication network can use the second communication network,
   wherein the authentication unit comprises:
      terminal identification information storage means which stores terminal identification information identifying a mobile communication terminal that can use the second communication network;
      terminal identification information reception means which receives the terminal identification information transmitted by the mobile communication terminal;
      first terminal identification information determination means which determines whether the terminal identification information received by the terminal identification information reception means is stored in the terminal identification information storage means; and first inquiry result notification means which, when the first terminal identification information determination means determines that the received terminal identification information is stored in the terminal identification information storage means, provides a notification to the mobile communication terminal, by transmitting a transmission power reduction instruction signal that instructs the mobile communication terminal to reduce its transmission power to a degree such that a first base station cannot receive a radio wave from the mobile communication terminal but reception by the mobile terminal from the first base station is maintained and the transmission power maintains the communication with the second communication network, a restriction means of the mobile terminal, when a communication availability determination means of the mobile terminal determines that a status in which the second communication network is available is changed to a status at which the second communication network is unavailable, controlling the transmission power for communication to recover to such a degree that the first base station can be communicated with, so that data transmission using the first communication network is enabled, and an inquiry result indicating that the mobile communication terminal can use the second communication network.

14. The mobile communication system according to claim 13, wherein the authentication unit comprises:
base station identification information storage means which stores base station identification information that identifies base stations of a communication network in which availability of communication can be determined;
terminal identification information storage means which stores, separately for each base station in which availability of communication can be determined, terminal identification information registered in advance that identifies a mobile communication terminal that can use the network;
identification information reception means which receives the terminal identification information and second base station identification information from the mobile communication terminal;
base station identification information determination means which determines whether the base station identification information corresponding to the second base station identification information received by the identification information reception means is stored in the base station identification information storage means;
terminal identification information obtaining means which, when the base station identification information determination means determines that the corresponding base station information is found, obtains terminal identification information corresponding to the second base station identification information from the terminal identification information storage means;
second terminal identification information determination means which determines whether the terminal identification information obtained by the terminal identification information obtaining means is stored in the terminal identification information storage means; and
second inquiry result notification means which, when the second terminal identification information determination means determines that the received terminal identification information is stored in the terminal identification information storage means, provides a result of the inquiry to the mobile communication terminal.

15. The mobile communication system according to claim 14, wherein the second inquiry result notification means, when the terminal identification information received by the identification information reception means is stored in the terminal identification information storage means, transmits all information obtained by the terminal identification information obtaining means, thereby notifying, to the mobile communication terminal, the inquiry result indicating mobile communication terminals which are able to use the second communication network, and the mobile communication system further comprising data transmission restriction means which, when receiving at least a piece of terminal identification information, restricts calling to the mobile communication terminal not indicated in the inquiry result, thereby restricting communication using the first communication network.

16. The mobile communication system according to claim 13, further comprising:
a third base station which constitutes at least the first communication network; and
connection switching means which:
in response to a connection request transmitted from the mobile communication terminal via the second communication network, determines a location of a destination end of communication, connects the mobile communication terminal to the destination end of the communication via the third base station when the destination end of the communication is within a communication area of the third base station, connects the mobile communication terminal to the destination end of the communication via the first communication network when the destination end of the communication is within the communication area of the first communication network other than the communication area of the third base station, and connects the mobile communication terminal to the destination end of the communication via the second communication network when the destination end of the communication is within the communication area of the second communication network;
in response to the connection request transmitted from the mobile communication terminal via the third base station, determines the location of the destination end of the communication, connects the mobile communication terminal to the destination end of the communication via the first communication network when the destination end of the communication is within the communication area of the first communication network, and connects the mobile communication terminal to the destination end of the communication via the second communication network when the destination end of the communication is within the communication area of the second communication network; and
in response to the connection request transmitted from the mobile communication terminal via the first communication network, determines the location of the destination end of the communication, connects the mobile communication terminal to the destination end of the communication via the first communication network when the destination end of the communication is within the first communication network, and connects the mobile communication terminal to the destination end of the communication via the third base station when the destination end of the communication is within the communication area of the third base station.

17. A computer-readable storage medium having recorded thereon a program which makes a computer included in a mobile communication terminal operate as:

communication availability determination means which determines whether a second communication network is available, in accordance with movement of the mobile communication terminal from a communication area of a first base station constituting a first communication network to the communication area of a second base station constituting the second communication network which is different from the first communication network;

communication means which performs transmission and reception to enable communications using at least the first communication network; and restriction means which controls the communication means to restrict communication that uses the first communication network, by controlling transmission power for communication to be reduced to a degree such that the first base station cannot receive a radio wave from the mobile communication terminal but reception by the mobile terminal from the first base station is maintained and the transmission power maintains the communication with the second communication network, when the communication availability determination means determines that the second communication network is available;

wherein the restriction means, when the communication availability determination means determines that a status in which the second communication network is available is changed to a status at which the second communication network is unavailable, controls the transmission power for communication to recover to such a degree that the first base station can be communicated with, so that data transmission using the first communication network is enabled.

\* \* \* \* \*